United States Patent
Yamashita et al.

(10) Patent No.: US 9,887,658 B2
(45) Date of Patent: Feb. 6, 2018

(54) DIRECT AC POWER CONVERTER

(71) Applicant: DAIKIN INDUSTRIES, LTD., Osaka-shi, Osaka (JP)

(72) Inventors: Naoya Yamashita, Osaka (JP); Toshiyuki Maeda, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 15/324,093

(22) PCT Filed: Jul. 21, 2015

(86) PCT No.: PCT/JP2015/070662
§ 371 (c)(1),
(2) Date: Jan. 5, 2017

(87) PCT Pub. No.: WO2016/010159
PCT Pub. Date: Jan. 21, 2016

(65) Prior Publication Data
US 2017/0201202 A1    Jul. 13, 2017

(30) Foreign Application Priority Data
Jul. 18, 2014 (JP) ................... 2014-147411

(51) Int. Cl.
*H02M 1/32* (2007.01)
*H02M 5/22* (2006.01)
(Continued)

(52) U.S. Cl.
CPC ............ *H02P 27/08* (2013.01); *H02M 5/458* (2013.01); *H02P 6/14* (2013.01)

(58) Field of Classification Search
CPC ............. H02M 1/12; H02M 1/15; H02M 7/06
See application file for complete search history.

(56) References Cited

U.S. PATENT DOCUMENTS

2009/0175059 A1* 7/2009 Sakakibara ....... H02M 7/53875
363/36
2009/0257261 A1* 10/2009 Sakakibara ........... H02M 5/275
363/164
(Continued)

FOREIGN PATENT DOCUMENTS

JP    2011-101505 A    5/2011
JP    2011-193678 A    9/2011
(Continued)

OTHER PUBLICATIONS

Ohnuma et al., "Experimental Verification of Single Phase to Three Phase Converter Using an Active Buffer circuit with a Charge Circuit", IEEJ 2010 Industry Applications Society Conference 1-124, 2010, pp. I-587-I-590.

*Primary Examiner* — Eduardo Colon Santana
*Assistant Examiner* — Charles S Laughlin
(74) *Attorney, Agent, or Firm* — Birch, Stewart, Kolasch & Birch, LLP

(57) ABSTRACT

When a rectifying duty dr, a discharge duty dc, a voltage between both ends Vc of a capacitor, and a rectified voltage Vrec of an AC voltage are introduced, a virtual DC link voltage in an inverter is expressed by dc·Vc+dr·Vrec. The discharge duty is a time ratio at which a switch is conductive. The rectifying duty has a value obtained by subtracting the discharge duty and a zero voltage duty from 1. The zero voltage duty is a time ratio at which the inverter adopts a zero voltage vector irrespective of the magnitude of a voltage output from the inverter. In a boost chopper, the capacitor is charged during a part of a period during which the virtual DC link voltage is greater than the rectified voltage.

10 Claims, 15 Drawing Sheets

(51) Int. Cl.
*H02M 7/42* (2006.01)
*H02P 27/08* (2006.01)
*H02P 6/14* (2016.01)
*H02M 5/458* (2006.01)

(56) References Cited

U.S. PATENT DOCUMENTS

| | | | | |
|---|---|---|---|---|
| 2011/0176340 | A1* | 7/2011 | Sakakibara | H02M 5/297 |
| | | | | 363/34 |
| 2014/0233276 | A1* | 8/2014 | Fujita | H02M 1/12 |
| | | | | 363/34 |
| 2015/0244282 | A1 | 8/2015 | Yamashita et al. | |
| 2016/0211784 | A1* | 7/2016 | Fujisawa | H02P 9/30 |

FOREIGN PATENT DOCUMENTS

| | | |
|---|---|---|
| JP | 2012-135184 A | 7/2012 |
| JP | 2014-82926 A | 5/2014 |

* cited by examiner

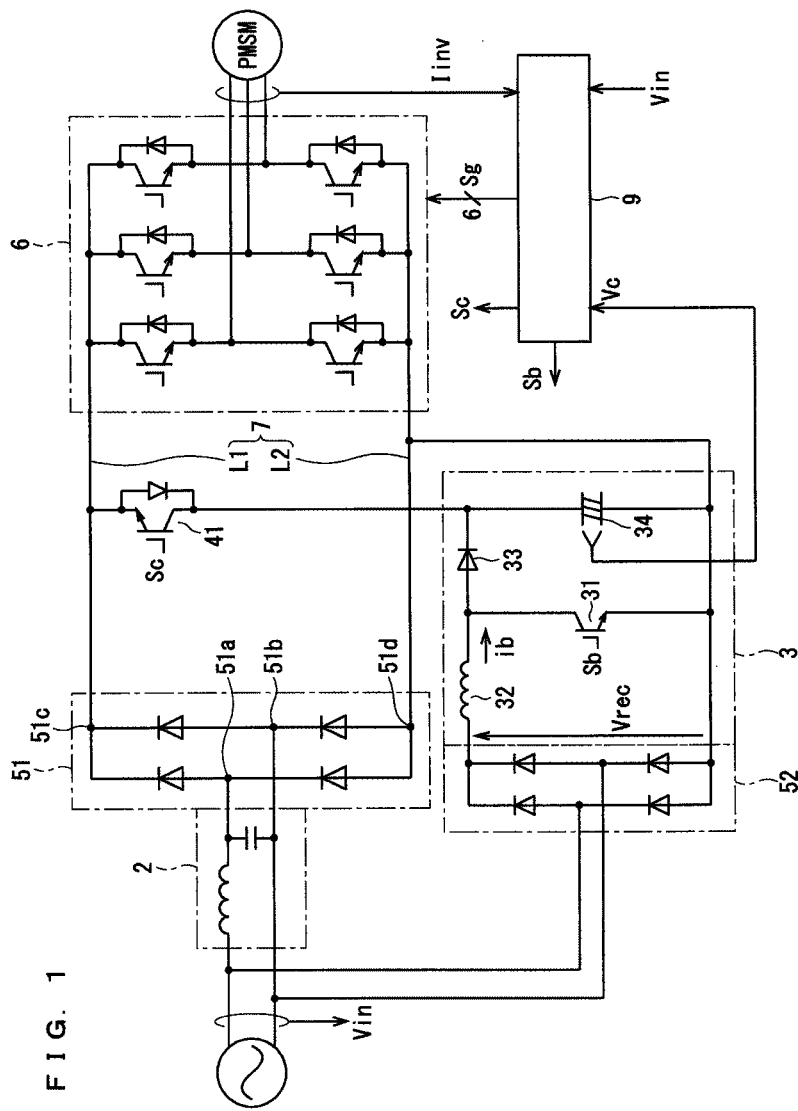
F I G. 1

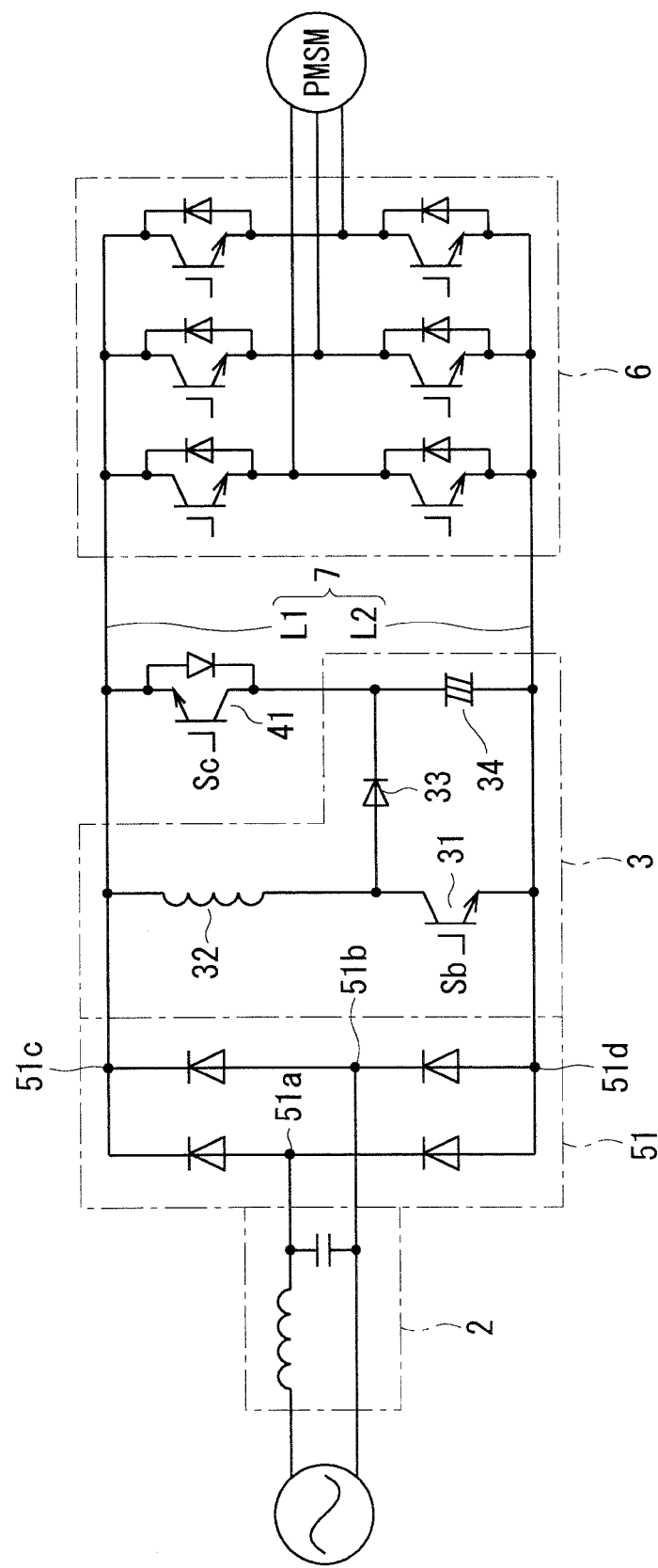
F I G. 2

F I G. 3
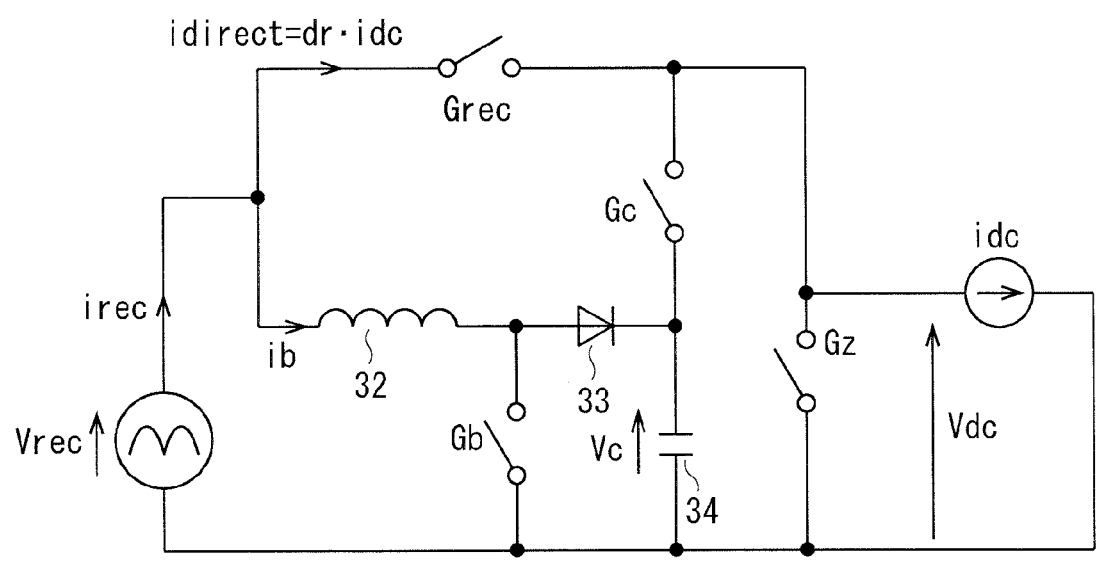

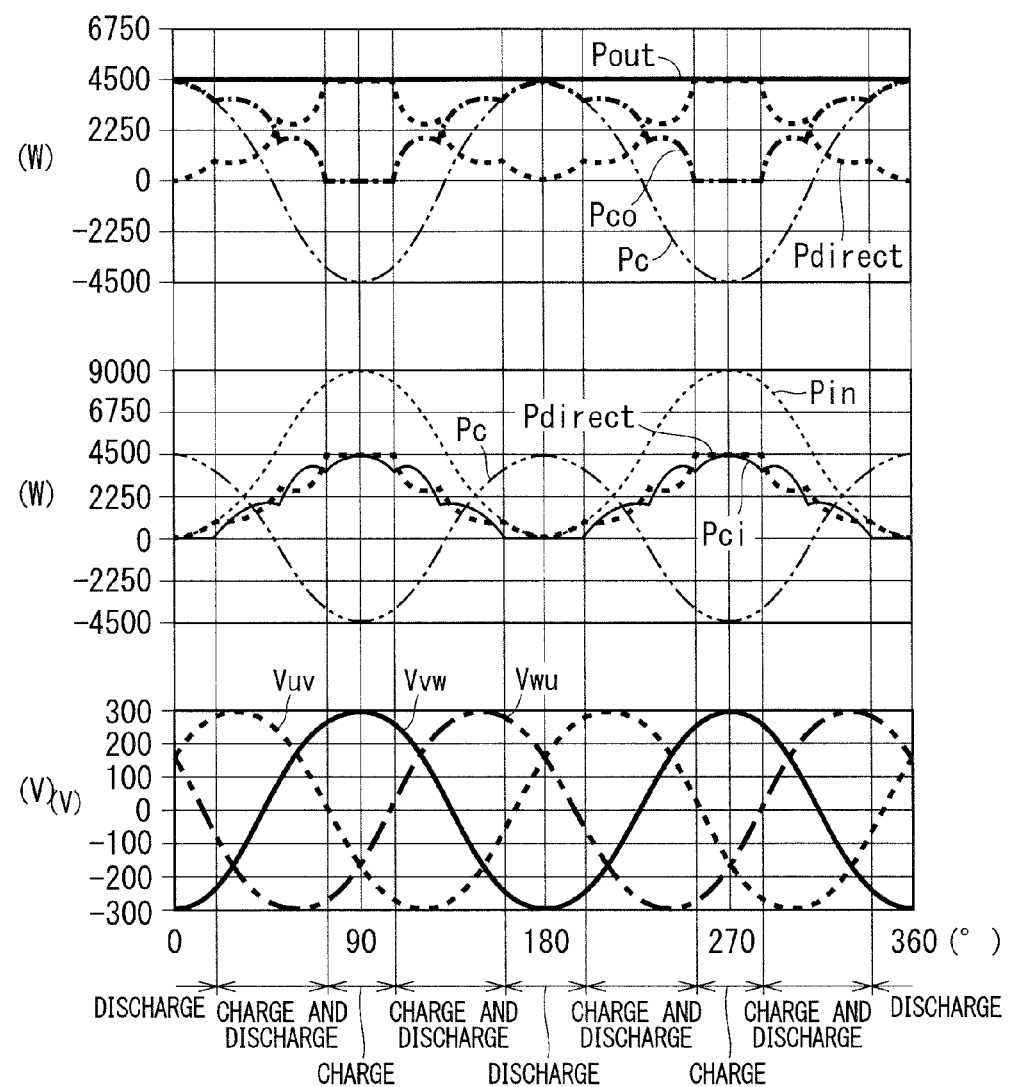
F I G. 1 3

F I G. 1 6
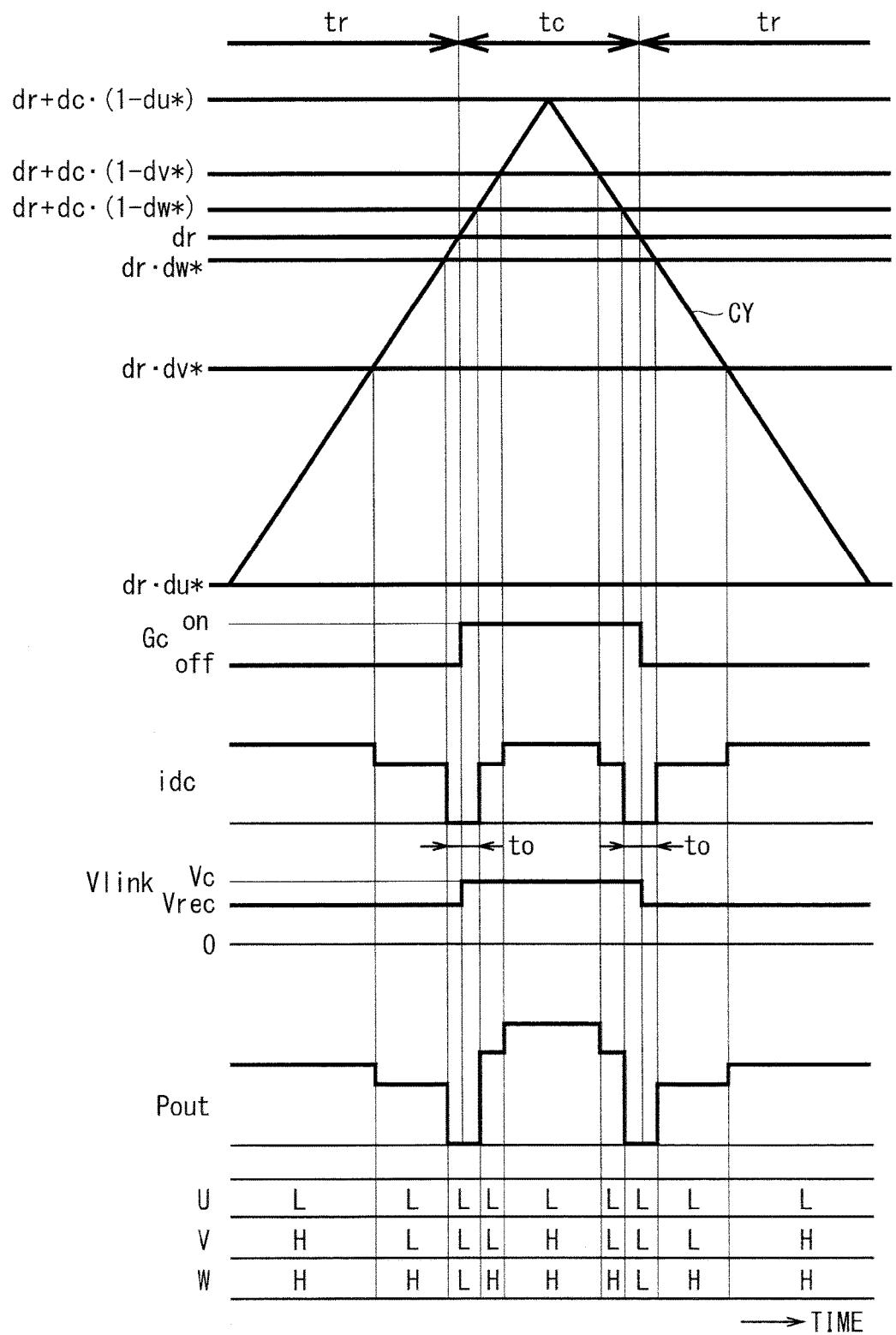

US 9,887,658 B2

DIRECT AC POWER CONVERTER

TECHNICAL FIELD

The present invention relates to a direct AC power converter, and particularly, to a configuration including a rectifying circuit, an inverter, and a boost chopper.

BACKGROUND ART

Japanese Patent Application Laid-Open No. 2011-193678, Japanese Patent Application Laid-Open No. 2012-135184 and Ohnuma, Itoh, "Experimental Verification of Single Phase to Three Phase Converter Using an Active Buffer circuit with a Charge Circuit", IEEJ 2010 Industry Applications Society Conference 1-124, pp. I-587-590 (2010) introduce direct AC power converters. In each of these direct AC power converters, a boost chopper is used and receives an electric power from a rectifying circuit and supplies the electric power to an inverter so that pulsation of an instantaneous power is reduced.

Summary of Invention

Problems to be Solved by the Invention

In the techniques introduced in Japanese Patent Application Laid-Open No. 2011-193678, Japanese Patent Application Laid-Open No. 2012-135184and Ohnuma, Itoh, "Experimental Verification of Single Phase to Three Phase Converter Using an Active Buffer circuit with a Charge Circuit", IEEJ 2010 Industry Applications Society Conference 1-124, pp. I-587-590 (2010), however, a period of charge from the rectifying circuit to the capacitor and a period of discharge from the capacitor to the inverter are set alternately in each ¼ of a cycle of an input AC voltage. The magnitude of an output voltage thus remains at $1/\sqrt{2}$ times a crest value of the input AC voltage.

Also in the technique described in Japanese Patent Application Laid-Open No. 2014-82926, a capacitor is unnecessarily charged and discharged in view of the operation of an inverter, so that a boost chopper is likely to require an increased power capacity.

The present invention therefore has an object to provide a technique of reducing a power capacity required for a boost chopper while increasing a voltage output from a direct AC power converter more than in a conventional technique.

Means to Solve the Problems

A direct AC power converter according to the present invention includes a DC link (7), a first rectifying circuit (5, 51), a boost chopper (3), and a switch (41).

The DC link has a first power supply line (L1) and a second power supply line (L2) to which a potential lower than a potential of the first power supply line is applied.

The first rectifying circuit has a plurality of input terminals that receive an input of an AC voltage, and a pair of output terminals (51c, 51d) each connected to the DC link.

The inverter converts a voltage applied to the DC link into another multi-phase AC voltage.

The boost chopper has a capacitor (34) at its output stage.

The switch performs a discharge/non-discharge from the capacitor to the DC link.

In a first aspect of the direct AC power converter according to the present invention, in the boost chopper, the capacitor is charged at least during a first period being a part of a period during which a discharge duty (dc) is greater than 0.

The discharge duty is a time ratio at which the switch is conductive.

A virtual DC link voltage (Vdc) is greater than or equal to a first value (V1) and smaller than or equal to a second value (V2). The virtual DC link voltage is expressed as a sum of a product (dc·Vc) of the discharge duty and a voltage between both ends (Vc) of the capacitor and a product (dr·Vrec) of a rectifying duty (dr) and a rectified voltage (Vrec) of the AC voltage.

The rectifying duty takes a value obtained by subtracting a sum of the discharge duty and a zero voltage duty (dz) from 1.

The zero voltage duty is a time ratio at which the inverter (6) adopts a zero voltage vector irrespective of magnitude of a voltage output from the inverter (6).

The first value is a maximum value (max(|Vuv|, |Vvw|, |Vwu|)) among absolute values of respective line-to-line voltages of the multi-phase AC voltage.

The second value is a maximum value that the absolute values can take. To an input side of the boost chopper, the rectified voltage is applied or the pair of output terminals of the rectifying circuit are connected.

In a second aspect of the direct AC power converter according to the present invention, in the first aspect, the capacitor is charged in the boost chopper during the first period and a part or whole of a period at which the discharge duty is 0.

In a third aspect of the direct AC power converter according to the present invention, in the first or second aspect, the capacitor (34) is charged and discharged with a charge power (Pci) and a discharge power (Pco) during the first period. The first period has a period during which the charge power is greater than the discharge power and a period during which the discharge power is greater than the charge power.

In a fourth aspect of the direct AC power converter according to the present invention, in any one of the first to third aspects, a period during which the virtual DC link voltage (Vdc) takes the first value (V1) is present.

In a fifth aspect of the direct AC power converter according to the present invention, in any one of the first to fourth aspects, the discharge duty at which the zero voltage duty (dz) is minimum is set based on a command value (irec*) of a rectified current (irec) being a sum of a current (ib) flowing in the boost chopper (3) and a current (idirect) flowing from the first rectifying circuit to the inverter (6), a command value (Vdc*) of the virtual DC link voltage (Vdc), a voltage between both ends (Vc) of the capacitor, the rectified voltage (Vrec), and a current (idc) input to the inverter (6).

In a sixth aspect of the direct AC power converter according to the present invention, in the fifth aspect, when the virtual DC link voltage (Vdc) is greater than the rectified voltage (Vrec) and the command value (irec*) of the rectified current (irec) is greater than or equal to a product of a predetermined value (dr_max) and a current (idc) input to the inverter (6), the rectifying duty (dr) takes the predetermined value, and the discharge duty (dc) takes a value obtained by subtracting the predetermined value from 1.

The predetermined value is a value ((Vdc*−Vc)/(Vrec−Vc)) obtained by dividing a value obtained by subtracting the voltage between both ends (Vc) of the capacitor from the command value (Vdc*) of the virtual DC link voltage (Vdc) by a value obtained by subtracting the voltage between both ends (Vc) from the rectified voltage (Vrec).

A seventh aspect of the direct AC power converter according to the present invention, in any one of the first to sixth aspects, further includes a second rectifying circuit (52) that inputs the rectified voltage (Vrec) to the boost chopper (3).

In an eighth aspect of the direct AC power converter according to the present invention, in any one of the first to sixth aspects, the pair of output terminals of the first rectifying circuit are connected to an input side of the boost chopper.

In a ninth aspect of the direct AC power converter according to the present invention, in the first aspect or any one of the third to eighth aspects, the discharge duty (dc) is always positive.

A tenth aspect of the direct AC power converter according to the present invention, in any one of the first to ninth aspects, further includes a diode in parallel with the switch (41). A forward direction of the diode is a direction in which the capacitor (34) is charged from the DC link (7).

Effects of the Invention

The capacitor is charged in the boost chopper at least during a part of the period in which the discharge duty is greater than 0, so that an average value of maximum values of voltages that can be output from the inverter in a cycle of control of switching of the inverter can exceed $1/\sqrt{2}$ times a crest value of the AC voltage.

A small discharge duty can be selected, and thus, the average value or the effective value of the current flowing in the inductor of the boost chopper can be reduced more than in the conventional technique.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a circuit diagram illustrating a configuration of a direct AC power converter according to an embodiment;

FIG. 2 is a circuit diagram illustrating another configuration of the direct AC power converter according to the embodiment;

FIG. 3 is a circuit diagram of an equivalent circuit of the direct AC power converter according to the embodiment;

FIGS. 12 and 13 are graphs showing waveforms of specifications of Example 3;

FIG. 16 is a graph showing an operation of an inverter of Example 2; and

DESCRIPTION OF EMBODIMENTS

Figure 4:
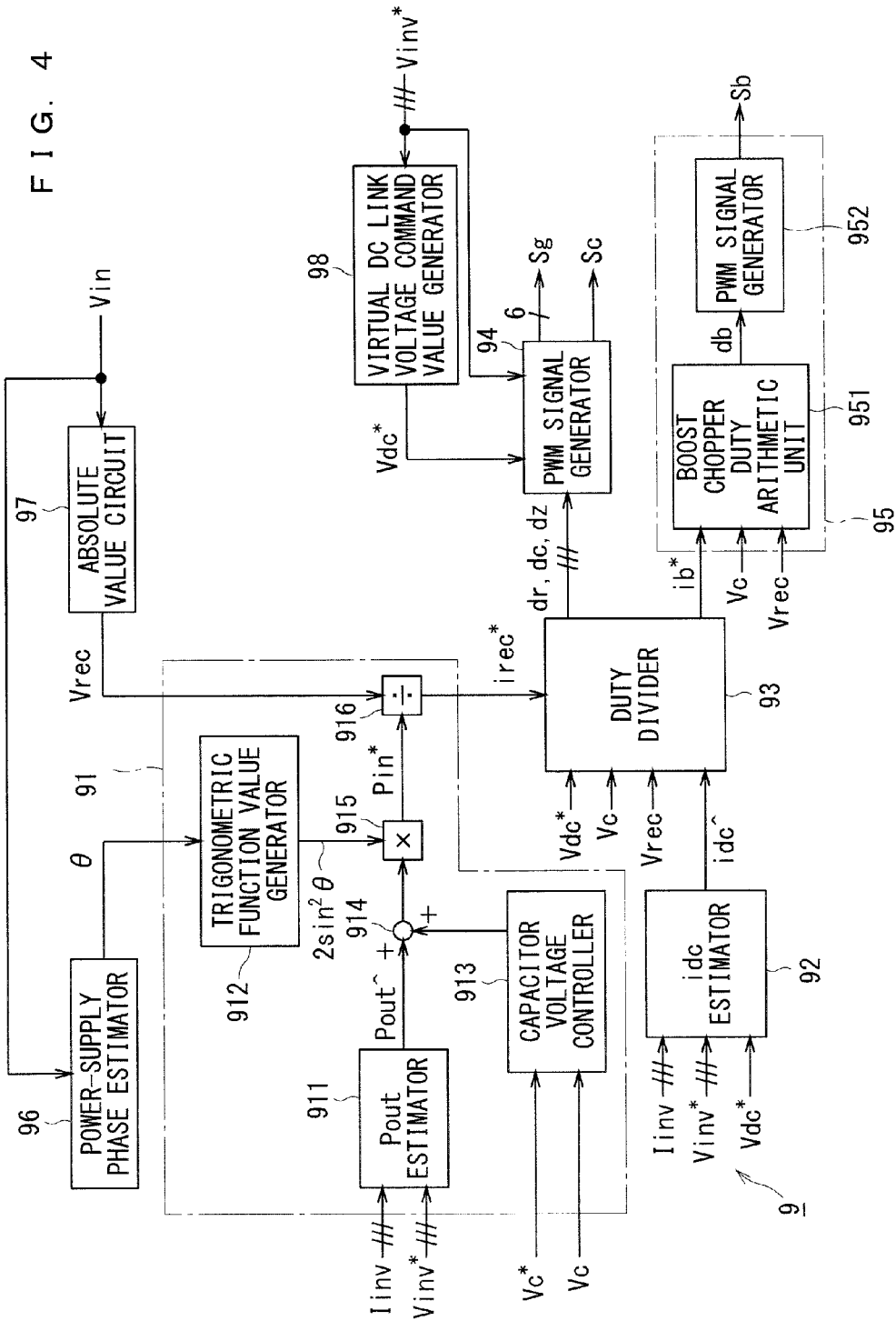
FIG. 4 is a block diagram illustrating a configuration of a controller of the direct AC power converter according to the embodiment.

FIG. 1 is a circuit diagram illustrating a configuration of a direct AC power converter according to an embodiment.

The direct AC power converter includes a DC link 7, rectifying circuits 51 and 52, a boost chopper 3, a switch 41, and an inverter 6.

The DC link 7 has power supply lines L1 and L2. A potential lower than the potential of the power supply line L1 is applied to the power supply line L2.

The rectifying circuit 51 has input terminals 51a and 51b that receive an AC voltage Vin and a pair of output terminals 51c and 51d respectively connected to the power supply lines L1 and L2. The rectifying circuit 51 is of a full-wave rectification type. Illustrated herein is a case in which the rectifying circuit 51 is formed by a diode bridge.

FIG. 1 illustrates a state in which the AC voltage Vin is supplied to the rectifying circuit 51 from a single-phase AC power supply via a filter circuit 2. The filter circuit 2, however, is provided to cut off a harmonic noise, and thus, a cutoff frequency of the harmonic noise is higher than the frequency of the AC voltage Vin. The function of the filter circuit 2 has hardly any influence on the operations of the respective sections described below, and accordingly, description will be given below without consideration of the operation of the filter circuit 2.

An operation of the switch 41 and switching operations of the boost chopper 3 and the inverter 6 are controlled by a controller 9. The controller 9 can be regarded as being included in the direct AC power converter as well.

The inverter 6 converts the voltage applied to the DC link 7 into another multi-phase AC voltage. Illustrated herein is a configuration in which the inverter 6 outputs a three-phase AC voltage to a permanent-magnet synchronous motor PMSM that serves as an inductive load. The inverter 6 is a voltage-source inverter that operates under instantaneous spatial vector control, and may have a publicly known configuration. The inverter 6 outputs a three-phase current Iinv to the permanent-magnet synchronous motor PMSM.

The boost chopper 3 has a capacitor 34 at its output stage. More specifically, a rectified voltage Vrec of the AC voltage Vin is applied to the boost chopper 3. The rectified voltage Vrec is generated by the rectifying circuit 52 of full-wave rectification type. Illustrated herein is a case in which the rectifying circuit 52 is formed by a diode bridge.

The boost chopper 3 has an inductor 32, a switch 31, and a diode 33 in addition to the capacitor 34. The rectified voltage Vrec is applied between one end of the inductor 32 and one end of the switch 31. The other end of the inductor 32, the other end of the switch 31, and an anode of the diode 33 are connected to each other. The capacitor 34 is connected between a cathode of the diode 33 and the one end of the switch 31. For example, the switch 31 is an insulated gate bipolar transistor.

Such a configuration is publicly known as the boost chopper, and thus, detailed operation thereof will be omitted.

It is noted here that the switch 31 is conductive/non-conductive in accordance with activity/non-activity of a control signal Sb and that a boost duty db that is a time ratio at which the switch 31 is conductive is determined by a command value ib* (described below) of a current ib flowing in the inductor 32, a capacitor voltage (voltage between both ends of the capacitor 34) Vc to be applied to the capacitor 34, and the rectified voltage Vrec.

The switch 41 performs discharge/non-discharge from the capacitor 34 to the DC link 7 in accordance with activity/non-activity of a control signal Sc. More specifically, the switch 41 is connected between the power supply lines L1 and L2 in series with the capacitor 34.

Normally, the boost chopper 3 operates to make the voltage between both ends of a capacitor (hereinbelow referred to as a "capacitor voltage") Vc higher than the rectified voltage Vrec. The switch 41 thus has a switch device for controlling whether to flow a current from the boost chopper 3 (more specifically, from the capacitor 34) toward the power supply line L1. For example, such a switch device is an insulated gate bipolar transistor.

A diode, a forward direction of which is the direction from the DC link 7 toward the boost chopper 3 (more specifically, from the power supply line L1 toward the capacitor 34), is desirably provided to charge the capacitor 34 with a regenerative current from the inverter 6.

The controller 9 receives an AC voltage Vin (more accurately, a signal indicating its waveform: the same applies to the following), a current Iinv output from the inverter 6, and a capacitor voltage Vc, and outputs control signals Sb, Sc, and Sg. The control signal Sg is a signal for controlling switching of the inverter 6. Since illustrated herein is a case in which the inverter 6 outputs a three-phase voltage, the control signal Sg is a group composed of 6 (=3×2) signals.

FIG. 2 is a circuit diagram illustrating another configuration of the direct AC power converter according to the embodiment. In comparison with the configuration shown in FIG. 1, the rectifying circuit 51 also serves as the rectifying circuit 52. That is to say, the pair of output terminals 51c and 51d of the rectifying circuit 5 are connected to an input side of the boost chopper 3. In this case, a rectified voltage Vrec is not always applied to the boost chopper 3, unlike the configuration shown in FIG. 1. This is because the other end of the inductor 32 is connected via the power supply line L1 to the switch 41, and depending on an operating status of the switch 41, the capacitor voltage Vc is applied to the boost chopper 3.

However, FIGS. 1 and 2 can be treated equivalently in an equivalent circuit described below, and thus, a control method described below is common. The equivalent circuit will be described first.

FIG. 3 is a circuit diagram of the equivalent circuit of each of the direct AC power converters shown in FIGS. 1 and 2. The rectified voltage Vrec is expressed as a voltage source, and accordingly, a switch Grec indicates whether the rectifying circuit 51 is conductive. The switches 31 and 41 are respectively indicated by switches Gb and Gc. However, the regenerative current from the inverter 6 is not taken into consideration, and the diode of the switch 41 is not taken into consideration.

The inverter 6 and its load are expressed as a current source for flowing a DC current idc into the inverter 6. With the switch Gz conductive, the inverter 6 operates with a so-called zero voltage vector. When the inverter 6 operates with the zero voltage vector, the inverter 6 short-circuits with respect to an inductive load with any one of the power supply lines L1 and L2, and thus does not receive a current from the DC link 7.

The inverter 6 is allowed to operate with any vectors other than the zero voltage vector when the inverter 6 receives a current from the DC link 7. The inverter 6 thus operates with any vectors other than the zero voltage vector when the switch Gz is not conductive.

When the capacitor voltage Vc higher than the rectified voltage Vrec is applied to the DC link 7, no current flows in the DC link 7 from the rectifying circuit 51. That is to say, the switch Grec is not conductive when the switch Gc is conductive.

As described in Japanese Patent Application Laid-Open No. 2011-193678 and Japanese Patent Application Laid-Open No. 2012-135184, when time ratios at which the switches Grec, Gc, and Gz are conductive are respectively a rectifying duty dr, a discharge duty dc, and a zero voltage duty dz, a sum of the three time ratios is 1. That is to say, Expression (1) below holds, where these time ratios are time ratios in a cycle shorter than a cycle of the AC voltage Vin and are time ratios regarding a carrier cycle controlled with approximation that the AC voltage Vin is constant.

$$dr+dc+dz=1 \qquad (1)$$

The zero voltage duty dz is a time ratio corresponding to a period during which the inverter 6 adopts the zero voltage vector irrespective of the magnitude of a voltage to be output. The discharge duty dc is a time ratio at which the switch 41 is conductive.

The rectifying duty dr is a time ratio at which the rectifying circuit 51 is conductive. Expression (1) reveals that the rectifying duty dr takes a value obtained by subtracting a sum of the discharge duty dc and the zero voltage duty dz from 1.

As the DC voltage applied to the DC link 7, the capacitor voltage Vc is adopted when the switch 41 is conductive and the rectified voltage Vrec is adopted when the switch 41 is not conductive. Here, a virtual voltage (referred to as a "virtual DC link voltage" in this application) Vdc is determined according to Expression (2) below.

$$Vdc=dr \cdot Vrec+dc \cdot Vc \qquad (2)$$

That is to say, the virtual DC link voltage Vdc is expressed as a sum of a product (dc·Vc) of the discharge duty dc and the capacitor voltage Vc and a product (dr·Vrec) of the rectifying duty dr and the rectified voltage Vrec. This can also be understood as an average of maximum values of voltages that the inverter 6 is capable of output in a cycle of control of switching of the switch 41 and the inverter 6. FIG. 3 shows the virtual DC link voltage Vdc as a voltage generated between both ends of the current source idc (this flows the DC current idc) representing the inverter 6 and its load.

The virtual DC link voltage Vdc is an average value of the maximum values of a voltage that the inverter 6 is capable of output as described above, and thus, the voltage output from the inverter 6 may fall below the virtual DC link voltage Vdc. In such a case, the inverter 6 adopts the zero voltage vector even when the switch 41 is conductive. This reflects a fact that as described above, the zero voltage duty dz is a time ratio corresponding to a period during which the inverter 6 adopts the zero voltage vector irrespective of the magnitude of the voltage output from the inverter 6 but is not a time ratio corresponding to all the periods during which the inverter 6 adopts the zero voltage vector.

In such an equivalent circuit, a current irec from the voltage source indicating the rectified voltage Vrec (referred to as a "rectified current" in this application) is understood as a sum of the current ib flowing in the inductor 32 (of the boost chopper 3) and a current idirect flowing from the rectifying circuit 51 into the inverter 6 in an actual configuration.

In the configuration shown in FIG. 1, the rectified current irec is not directly indicated. With reference to FIG. 1, the current idirect is a current flowing from the rectifying circuit 51 into the DC link 7, and the current ib is a current flowing from the rectifying circuit 52 into the boost chopper 3.

In the configuration shown in FIG. 2, the rectified current irec is output from the output terminal 51c, and a portion thereof that flows into the inductor 32 is the current ib.

Since the switch Grec indicates the conductivity/non-conductivity of the rectifying circuit 51, the rectifying duty dr that is a time ratio at which the rectifying circuit 51 is conductive is expressed as a value obtained by dividing the current idirect by the DC current idc. Thus, Expression (3) below holds.

$$irec = dr \cdot idc + ib \qquad (3)$$

In Japanese Patent Application Laid-Open No. 2011-193678, Japanese Patent Application Laid-Open No. 2012-135184 and Ohnuma, Itoh, "Experimental Verification of Single Phase to Three Phase Converter Using an Active Buffer circuit with a Charge Circuit", IEEJ 2010 Industry Applications Society Conference 1-124, pp. I-587-590 (2010), a period during which the current ib is allowed to flow is excluded from a period (providing period) during which the capacitor 34 provides electric power to the DC link 7. Furthermore, the providing period and a period (receiving period) during which the capacitor 34 receives electric power from the DC link 7 are set alternately in each ¼ of the cycle of the AC voltage Vin. For this reason, the virtual DC link voltage Vdc does not exceed $1/\sqrt{2}$ times a crest value of the AC voltage.

However, the capacitor 34 is not always discharged and is conductive at the discharge duty dc even during the providing period. Therefore, even the providing period includes a period during which the capacitor 34 can be charged. In contrast, the providing period is necessary in a period during which the virtual DC link voltage Vdc is greater than the rectified voltage Vrec. This is because, even with dc=0, as is clear from Expression (2), the virtual DC link voltage Vdc can be determined only by the rectified voltage Vrec, the rectifying duty dr, and the zero voltage duty dz when the virtual DC link voltage Vdc is smaller than the rectified voltage Vrec.

In other words, at least during a part of the period during which the virtual DC link voltage Vdc is greater than the rectified voltage Vrec (dc>0 during this period: a reason for this will be described below), the capacitor 34 is charged in the boost chopper 3 so that the capacitor 34 is supplemented with an electric power. As a result, the virtual DC link voltage Vdc can exceed $1/\sqrt{2}$ times the crest value of the AC voltage Vin. Needless to say, the capacitor 34 can be charged during a part or whole of the period during which dc=0.

Alternatively, the period during which the capacitor 34 is charged can be set to be longer than in a conventional technique even when the virtual DC link voltage Vdc does not exceed $1/\sqrt{2}$ times the crest value of the AC voltage Vin, thus reducing an average value or an effective value of the current ib flowing in the inductor 32 more than in a conventional technique.

More detailed description will be given below. The discharge duty dc is desirably set to be small in order to reduce a loss in the boost chopper 3 and a rated current required for the inductor 32.

Considered first is the case in which the rectified current irec is greater than the current idirect. According to Expression (3), this is the case in which there is a margin for flowing the current ib in the boost chopper 3, and the magnitude of the rectifying duty dr is not limited by the rectified current irec. In this case, the case in which the virtual DC link voltage Vdc is made to be smaller than or equal to the rectified voltage Vrec is considered as a first case. In the first case, dc=0 and dz>0 as described above. Specifically, setting is made such that dc=0 in Expressions (1) and (2), so that the rectifying duty dr and the zero voltage duty dz in the first case are determined by Expression (4) below. At this time, the capacitor 34 is not discharged via the switch 41.

$$dr = Vdc/Vrec, \; dz = 1 - Vdc/Vrec \qquad (4)$$

In other words, it is revealed that when a command value Vdc* of the virtual DC link voltage Vdc is set, the rectifying duty dr should be set to a ratio (Vdc*/Vrec) of the command value Vdc* to the rectified voltage Vrec, and the zero voltage duty dz should be set to a value obtained by subtracting the ratio from 1 in order to cause the virtual DC link voltage Vdc to follow the command value Vdc* with the discharge duty dc being zero in the first case.

It is also revealed that the zero voltage duty dz is minimum in this case. This is because, according to Expression (2), the zero voltage duty dz needs to be increased in order to match the virtual DC link voltage Vdc with the command value Vdc* even when the discharge duty dc increases.

In other words, in the first case, setting the rectifying duty dr to the ratio (Vdc*/Vrec) can be regarded as setting a discharge duty dc for making the zero voltage duty dz minimum and setting a value of the discharge duty dc to 0. When the control above is performed in the first case, the capacitor 34 is not discharged.

The case in which the rectified current irec is greater than the current idirect and the virtual DC link voltage Vdc is greater than the rectified voltage Vrec is considered as a second case. In this case, it is obvious from Expression (2) that the discharge from the capacitor 34 to the DC link 7 needs to be performed. That is to say, the discharge duty dc is positive. It is also obvious from Expression (2) that the virtual DC link voltage Vdc should be smaller than or equal to the capacitor voltage Vc.

A zero voltage duty dz that does not contribute to a rise in the virtual DC link voltage Vdc needs to be reduced in order to reduce the discharge duty dc for reduced loss or rated current. In the second case, the magnitude of the rectifying duty dr is not limited by the rectified current irec as in the first case, and thus, the DC current idc can be fed by the rectified current irec. The zero voltage duty dz can therefore be reduced to zero.

According to the above and Expression (1), Expression (2) can be transformed into Expression (5) below.

$$Vdc = dr \cdot Vrec + (1 - dr) \cdot Vc \; \therefore dr = (Vdc - Vc)/(Vrec - Vc) \qquad (5)$$

In other words, it is found that in order to cause the virtual DC link voltage Vdc to follow the command value Vdc* in the second case, the rectifying duty dr should be set to a ratio (Vdc*−Vc)/(Vrec−Vc), and the discharge duty dc should be set to a value obtained by subtracting the ratio from 1.

In the second case, setting the rectifying duty dr as described above can be regarded as setting the discharge duty dc to make the zero voltage duty dz minimum and setting a value of the discharge duty dc to (1−dr). This is because the zero voltage duty dz reduces to zero also in this case.

It can be regarded that the control of each duty means setting the discharge duty dc for making the zero voltage duty dz minimum based on two viewpoints. The first viewpoint is whether the rectified current irec is greater than the current idirect, that is, whether the command value irec* of the rectified current irec is set to be greater than the current idirect. The second viewpoint is whether the virtual DC link voltage Vdc is greater than the rectified voltage Vrec, that is, whether the command value Vdc* is greater than the rectified voltage Vrec.

The circuit shown in FIG. 1 can afford to flow the current ib from the rectifying circuit 52, and the circuit shown in FIG. 2 can afford to flow the current ib from the rectifying circuit 51. Therefore, when the DC current idc is estimated, the use of an estimated value idc^ thereof allows the command value ib* of the current ib to be set according to Expression (6) below in consideration of Expression (3).

$$ib^* = irec^* - dr\_max \cdot idc\hat{} \quad (6)$$

Herein, dr_max is a rectifying duty dr represented by Expression (4) in the first case and by Expression (5) in the second case.

In particular, when the virtual DC link voltage Vdc is greater than the rectified voltage Vrec as in the second case, a providing period appears during which discharge is performed from the capacitor 34 to the DC link 7 at the discharge duty dc. During this providing period, the current ib flows in accordance with the command value ib* represented by Expression (6), and thus, not only the discharge but also the charge of the capacitor 34 is performed.

In this application, therefore, the period corresponding to the second case is referred to as a "charge and discharge zone". In contrast, the period corresponding to the first case is referred to as a "charge zone" in this application because the capacitor 34 is not discharged but is only charged.

A known approach can be employed for a switching operation to be performed by a switch Gb (switch 31) using the current ib flowing in the boost chopper 3 to charge the capacitor 34 to the capacitor voltage Vc. This approach may be of a so-called discontinuous current mode, a critical mode, or a continuous current mode.

The case in which the rectified current irec is smaller than or equal to the current idirect is then considered as a third case. This is the case in which there is no margin for flowing the current ib with reference to Expression (3). Alternatively, this is the case in which ib*<0 with reference to Expression (6), that is, the case in which Expression (7) below holds.

$$irec^* < dr\_max \cdot idc\hat{} \quad (7)$$

The current ib does not actually take a negative value, and thus, the rectifying duty dr that takes a value smaller than dr_max is adopted under the condition of Expression (7) so that Expression (3) is established under conditions where irec≥0, dr≥0, idc>0, and ib≥0.

The command value ib* of the current ib is set to 0 so as to always satisfy ib≥0. That is to say, the capacitor 34 is not charged during a period during which Expression (7) holds, and the capacitor 34 is discharged at a discharge duty dc determined below. In this application, therefore, the period during which Expression (7) holds is referred to as a "discharge zone".

The rectifying duty dr is determined according to Expression (8) below with the use of the command value irec* and the estimated value idc^, in consideration of Expression (7).

$$dr = irec^*/idc\hat{} \quad (8)$$

That is to say, in order to cause the virtual DC link voltage Vdc to follow the command value Vdc*, the rectifying duty dr is set to a ratio (irec*/idc^) of the command value irec* to the estimated value idc^.

Expression (9) below needs to hold in consideration of Expression (2) in order to cause the virtual DC link voltage Vdc to follow the command value Vdc*.

$$Vdc^* = dr \cdot Vrec + dc \cdot Vc \quad (9)$$

Herein, the rectifying duty dr is set to a value set by Expression (8), and the capacitor voltage Vc is substantially fixed. Thus, parameters that can be selected to make the right side of Expression (9) equal to the given command value Vdc* are the zero voltage duty dz and the discharge duty dc.

The discharge duty dc is determined according to Expression (10) below directly led from Expression (9).

$$dc = (Vdc^* - dr \cdot Vrec)/Vc \quad (10)$$

It is noted that the capacitor voltage Vc technically reduces during the period during which Expression (7) holds ("discharge zone"). This is because the command value ib* is set to 0 as described above. However, appropriately setting the command value irec* reduces the discharge zone to such an extent that a reduction in the capacitor voltage Vc can be ignored.

In Japanese Patent Application Laid-Open No. 2011-193678, Japanese Patent Application Laid-Open No. 2012-135184 and Ohnuma, Itoh, "Experimental Verification of Single Phase to Three Phase Converter Using an Active Buffer circuit with a Charge Circuit", IEEJ 2010 Industry Applications Society Conference 1-124, pp. I-587-590 (2010), the rectified current irec has a waveform of full-wave rectification, and thus, such selection of the command value irec* was not considered. However, in this embodiment, since the rectified current irec is not limited to the waveform of full-wave rectification, the discharge zone is shortened, and the discharge duty dc can be set with Expression (10) where the capacitor voltage Vc is constant.

Due to the restricting condition of Expression (1), the zero voltage duty dz is obtained by Expression (11) below.

$$dz = 1 - dr - dc \quad (11)$$

As described above, during the discharge zone, the rectifying duty dr is determined according to Expression (8) when the command value irec* and the estimated value idc^ are obtained, and further, the discharge duty dc and the zero voltage duty dz are uniquely determined according to Expressions (10) and (11), respectively.

That is to say, the zero voltage duty dz is not allowed to take a value greater than or equal to a value determined by Expression (11), and is thus considered to be set to a minimum value thereof. That is to say, it can be regarded that the discharge duty dc to make the zero voltage duty dz minimum is set also in the discharge zone as in the charge zone and the charge and discharge zone.

When the rectifying duty dr, the zero voltage duty dz, the discharge duty dc, and the command value ib* are determined in the manner above, the control signals Sb, Sc, and Sg can be generated using a known technique.

FIG. 4 is a block diagram illustrating a configuration of the controller 9. The controller 9 is roughly divided into a current command generator 91, a DC current (idc) estimator 92, a duty divider 93, a pulse width modulation (PWM) signal generator 94, and a chopper signal generator 95.

The current command generator 91 generates the command value irec* of the rectified current irec. Although FIG.

4 illustrates a configuration in which the command value irec* has an absolute value of a sinusoidal waveform as described below, the command value irec* is not always limited to providing such a waveform.

The DC current estimator 92 obtains the estimated value idc^ of the DC current idc. As is understood from the equivalent circuit of FIG. 3, an actual circuit has no portion that can actually measure the DC current idc. Therefore, the estimated value idc^ is adopted in the computations represented by Expressions (6) and (8).

An electric power to be output from the inverter 6 can be obtained in the equivalent circuit from the DC current idc and the virtual DC link voltage Vdc. In contrast, an electric power to be output from the inverter 6 in an actual circuit is obtained from a three-phase current Iinv and a three-phase voltage Vinv to be output from the inverter 6. Therefore, theoretically, the estimated value idc^ can be obtained from the virtual DC link voltage Vdc, the current Iinv, and the voltage Vinv.

It is noted that the voltage Vinv to be output from the inverter 6 is controlled by the pulse width modulation signal generator 94 to follow its command value Vinv*. The virtual DC link voltage Vdc cannot be measured per se, but is controlled by the duty divider 93 to follow the command value Vdc*. The current Iinv can be measured from wire connection between the inverter 6 and the permanent-magnet synchronous motor PMSM. In this embodiment, therefore, the estimated value idc^ is obtained from the command values Vdc* and Vinv* and the current Iinv. Needless to say, the estimated value idc^ may be obtained by another method.

The duty divider 93 determines the rectifying duty dr, the zero voltage duty dz, the discharge duty dc, and the command value ib* in accordance with the methods described in the first to third cases on the basis of the command values Vdc* and irec*, the capacitor voltage Vc, the rectified voltage Vrec, and the estimated value idc^. The expression "duty 'divider'" is given here because as represented by Expression (2), a value 1 is divided by the rectifying duty dr, the zero voltage duty dz, and the discharge duty dc.

The pulse width modulation signal generator 94 generates the control signals Sc and Sg on the basis of the rectifying duty dr, the zero voltage duty dz, the discharge duty dc, and the command values Vinv* and Vdc*. For example, these duties and respective phase portions of the command value Vinv* are operated to generate signal waves, and the signal waves can be compared to a triangular carrier to generate the control signals Sc and Sg. Since such a method is publicly known and is described in, for example, Japanese Patent Application Laid-Open No. 2011-193678 and Japanese Patent Application Laid-Open No. 2012-135184, detailed description thereof will be omitted.

The chopper signal generator 95 has a boost chopper duty arithmetic unit 951 and a pulse width modulation (PWM) signal generator 952. The boost chopper duty arithmetic unit 951 determines the boost duty db on the basis of the command value ib*, the capacitor voltage Vc, and the rectified voltage Vrec.

A method for determining the boost duty db differs depending on a mode in which the boost chopper 3 operates. The method may be a normal method for determining the discharge duty of a boost chopper, and thus, detailed description thereof will be omitted.

The pulse width modulation signal generator 952 can also generate the control signal Sb from the boost duty db by a known modulation method.

A configuration of the current command generator 91 will now be described. The current command generator 91 has an output power (Pout) estimator 911, a trigonometric function value generator 912, a capacitor voltage controller 913, an adder 914, a multiplier 915, and a divider 916.

The output power estimator 911 obtains an estimated value Pout^ of an output power Pout based on the command value Vinv* and the current Iinv. The DC current estimator 92, which obtains the estimated value idc^ as described above, may receive inputs of the estimated value Pout^ obtained from the output power estimator 911 and the command value Vdc* so as to obtain the estimated value idc^.

The capacitor voltage controller 913 obtains a deviation Vc*−Vc between the capacitor voltage Vc and its command value Vc* and performs at least proportional control on the deviation Vc*−Vc, then outputting the deviation Vc*−Vc to the adder 914.

The adder 914 adds an output from the capacitor voltage controller 913 to the estimated value Pout^. This is a process for suitably setting a command value Pin* of the input power by correcting the estimated value Pout^ to be greater/smaller when the capacitor voltage Vc becomes smaller/greater than the command value Vc*, thus reducing the deviation. For stability of the deviation, the capacitor voltage controller 913 desirably adopts not mere proportional control itself but proportional-integral control or proportional-integral-derivative control.

Assumed here is a case in which the command value irec* of the rectified current irec takes an absolute value of the sinusoidal waveform. The rectified voltage Vrec takes the absolute value of the sinusoidal waveform, and thus, an output from the adder 914 is multiplied by a trigonometric function value $2 \cdot \sin^2 \theta$, thus obtaining the command value Pin*.

The trigonometric function value generator 912 generates the trigonometric function value $2 \cdot \sin^2 \theta$ based on a phase angle $\theta$ of the power-supply voltage. The multiplier 915 multiplies an addition result of the adder 914 and the trigonometric function value $2 \cdot \sin^2 \theta$ to obtain the command value Pin*.

Since an input power Pin is a product of the rectified voltage Vrec and the rectified current irec, the command value irec* of the rectified current irec is obtained by dividing the command value Pin* by the rectified voltage Vrec.

The phase angle $\theta$ is estimated from, for example, the measured AC voltage Vin by a power-supply phase estimator 96. The power-supply phase estimator 96 can be constituted by, for example, a phase locked loop. The rectified voltage Vrec can be obtained, for example, in such a manner that an absolute value circuit 97 obtains an absolute value of the measured AC voltage Vin. Since specific configurations of the power-supply phase estimator 96 and the absolute value circuit 97 are publicly known techniques, which will not be described here in detail.

The command value Vdc* is set by a virtual DC link voltage command value generator 98 on the basis of the command value Vinv* according to the expression below. It is noted that the command value Vdc* is a maximum value of the voltage Vinv (which is, here, an average in a cycle of controlling switching) of the inverter 6 as described above, and thus, setting the command value Vdc* below the command value Vinv* is not appropriate. In other words, the command value Vdc* needs to be increased in order to increase a maximum value of the command value Vinv*. In a conventional direct power converter, the command value Vdc* is smaller than or equal to $1/\sqrt{2}$ times the AC voltage Vin.

Figure 5:
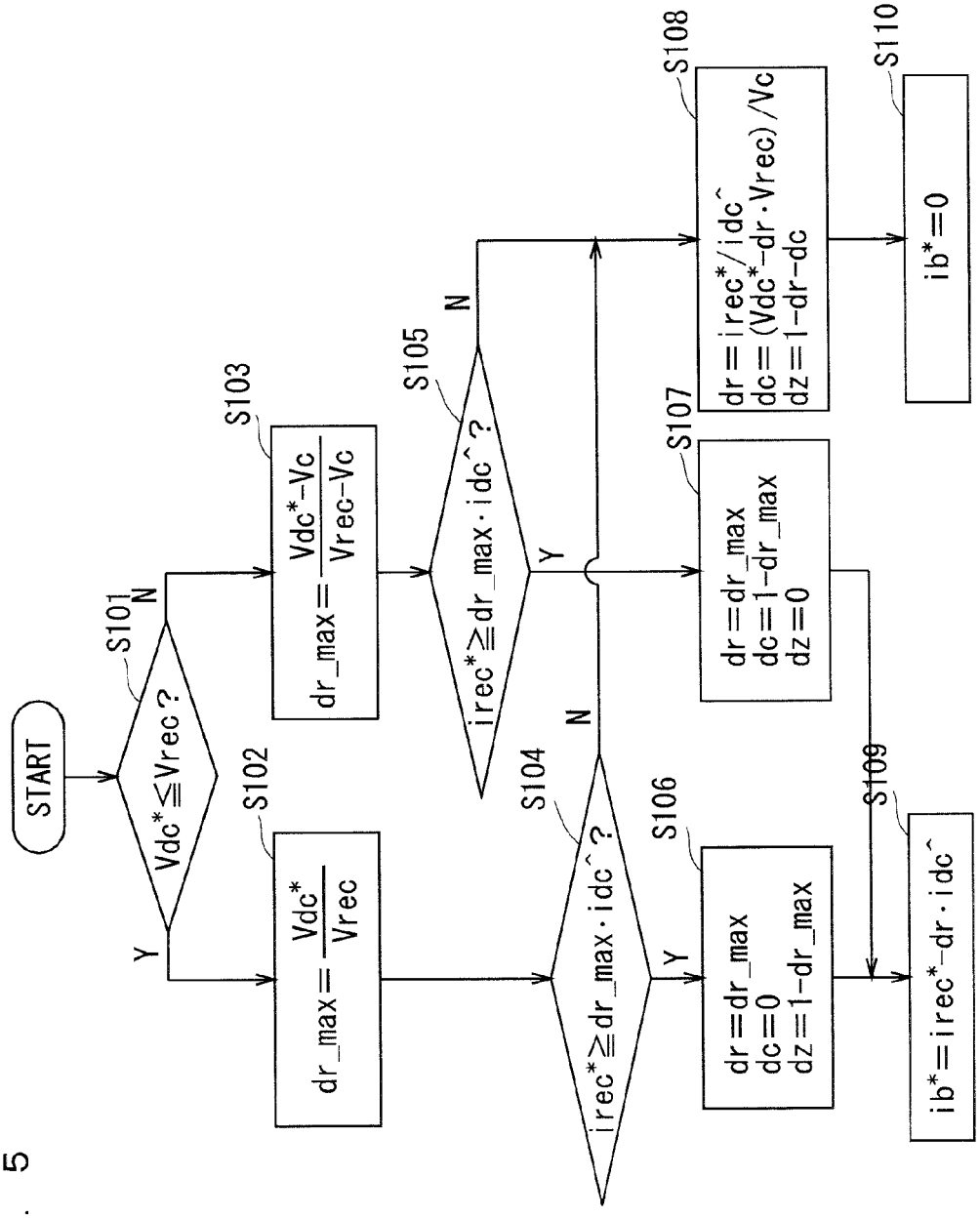
FIG. 5 is a flowchart summarizing steps of obtaining a rectifyingduty, a zero voltage duty, a discharge duty, and a current command value.

FIG. 5 is a flowchart summarizing steps of obtaining the rectifying duty dr, the zero voltage duty dz, the discharge duty dc, and the command value ib*. It is grasped that this flowchart shows an operation of the duty divider 93.

Step S101 corresponds to a determination whether the operation of the direct AC power converter corresponds to the first case or the second case on the assumption that the operation does not correspond to the third case. It is determined in Step S101 whether the command value Vdc* of the virtual DC link voltage Vdc is smaller than or equal to the rectified voltage Vrec. The process proceeds to Steps S102 and S104 if the determination is affirmative or proceeds to Steps S103 and S105 if the determination is negative.

Steps S102 and S104 are processes for determining whether the operation of the direct AC power converter corresponds to the first case or the third case. In Step S102, dr_max=Vdc*/Vrec is obtained in consideration of Expression (4). It is determined in Step S104 whether the command value irec* is greater than or equal to a value dr_max idc^ in consideration of Expression (7). If the determination in Step S104 is affirmative, the operation of the direct AC power converter corresponds to the first case, and the process proceeds to Steps S106 and S109. If the determination in Step S104 is negative, the operation of the direct AC power converter corresponds to the third case, and the process proceeds to Steps S108 and S110.

Steps S103 and S105 are processes for determining whether the operation of the direct AC power converter corresponds to the second case or the third case. In Step S103, dr_max=(Vdc*−Vc)/(Vrec−Vc) is obtained in consideration of Expression (5). In Step S105, whether the command value irec* is greater than or equal to the value dr_max·idc^ is determined in consideration of Expression (7) as in Step S104. If the determination of Step S105 is affirmative, the operation of the direct AC power converter corresponds to the second case, and the process proceeds to Steps S107 and S109. If the determination is negative in Step S105, the operation of the direct AC power converter corresponds to the third case, and the process proceeds to Steps S108 and S110.

Steps S106, S107, and S108 are setting of duties respectively corresponding to the first case, the second case, and the third case. Step S109 is the setting of the command value ib* according to the first case and the second case, and Step S110 is the setting of the command value ib* according to the third case. These setting contents are as described above.

If Vdc>Vrec, Step S107 or S108 is performed according to the determination result of Step S101. When Step S107 is performed, the discharge duty dc takes a value (1−dr). In this case, the rectifying duty dr is represented by Expression (5) and is smaller than 1. In this case, therefore, the discharge duty dc is greater than 0.

When Step S108 is performed, the discharge duty dc takes a value represented by Expression (10). If Vdc>Vrec, a numerator of the right side of Expression (10) is greater than 0 irrespective of the value of the rectifying duty dr. Also in this case, therefore, the discharge duty dc is greater than 0.

That is to say, when Vdc>Vrec, setting is always made such that dc>0.

The controller 9 can be implemented by, for example, a microcomputer and a storage device. The microcomputer executes the respective steps (in other words, the procedure) described in a program. The storage device can be configured by, for example, one or a plurality of various storage devices such as a ROM (Read Only Memory), a RAM (Random Access Memory), a rewritable non-volatile memory (such as EPROM (Erasable Programmable ROM)), and a hard disc device. The storage device stores various information, data, and the like, stores a program to be executed by the microcomputer, and provides a work area for executing the program. It can be grasped that the microcomputer functions as various means corresponding to the respective processing steps described in the program or implements various functions corresponding to the respective steps. Further, the controller 9 is not limited to this, and some or all of various procedures (such as obtaining respective measured values and executing Steps S101 to S110) to be executed by the controller 9, or respective elements or various functions of the controller 9 may be implemented by hardware.

EXAMPLES

Examples describing the effects of the use of the above methods will be described below.

Two examples of the case in which the command value Vdc* takes a constant value will be described first, and then, an example of a desirable value of the command value Vdc* will be described.

Example 1

Figure 6:
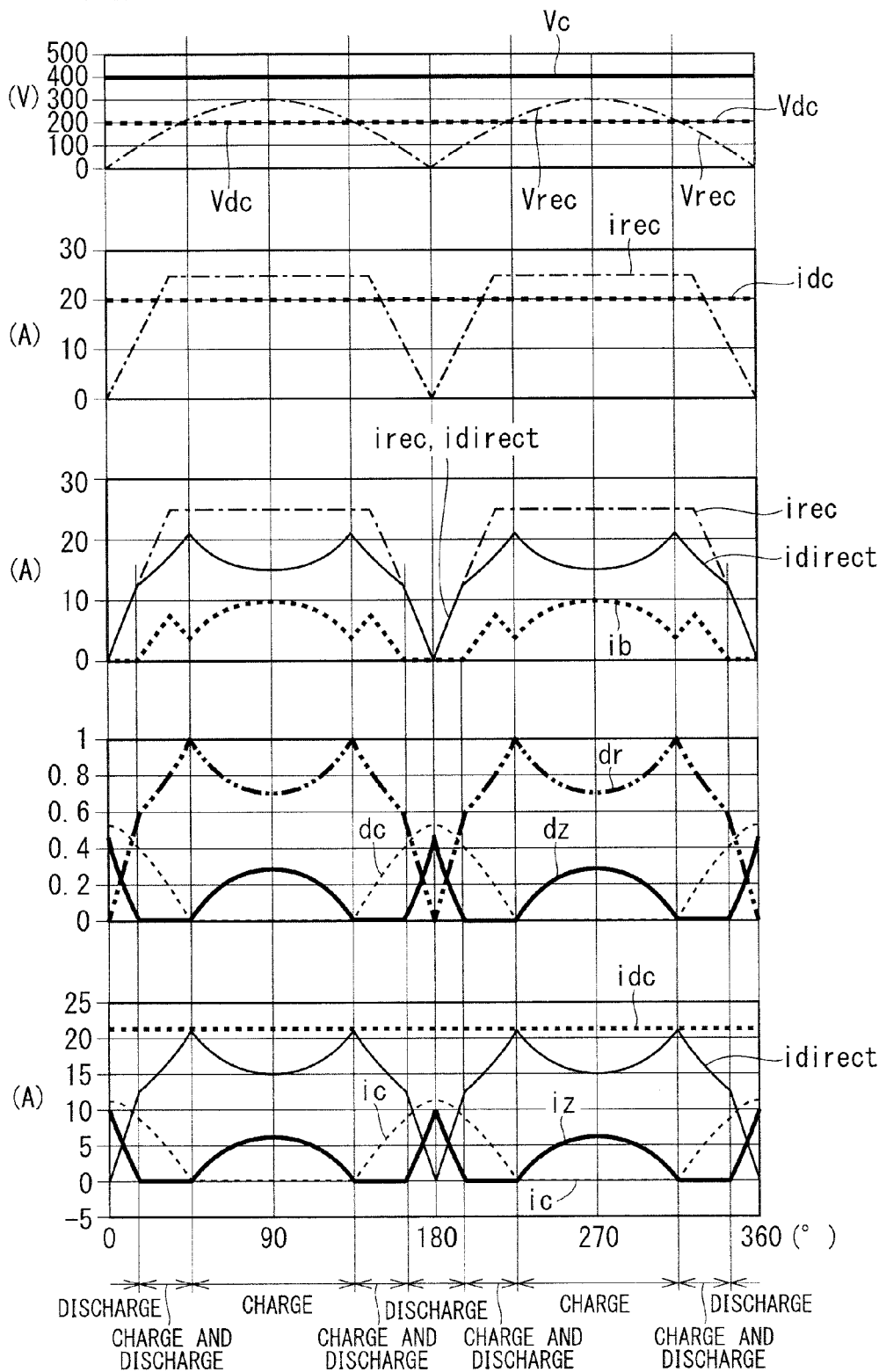
FIGS. 6 and 7 are graphs showing waveforms of specifications of Example 1.
Figure 7:
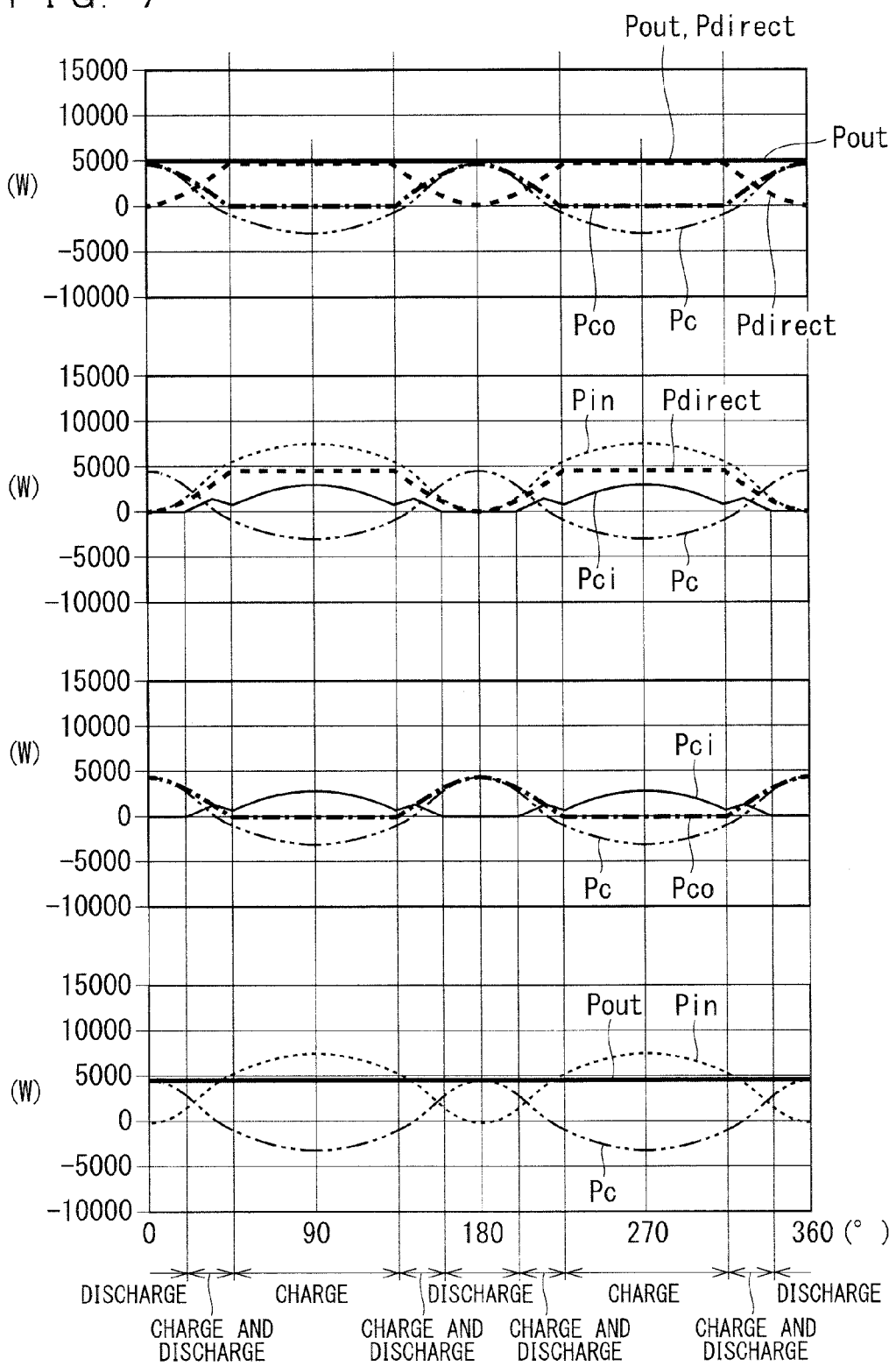

FIGS. 6 and 7 are graphs showing waveforms of specifications obtained by simulation. It is noted that the virtual DC link voltage Vdc is set to $1/\sqrt{2}$ (212 V) of a crest value (300 V) of the rectified voltage Vrec. The capacitor voltage Vc is higher than the rectified voltage Vrec and is constant (400 V) (the same applies to the following).

A first tier of FIG. 6 shows waveforms of the capacitor voltage Vc, the rectified voltage Vrec, and the virtual DC link voltage Vdc (this is assumed to accurately follow its command value Vdc*: the same applies to the following).

A second tier of FIG. 6 shows waveforms of the rectified current irec (this is assumed to accurately follow its command value irec*: the same applies to the following) and the DC current idc (this is assumed to accurately estimated by the estimated value idc^: the same applies to the following). The DC current idc set to a constant value, in cooperation with the virtual DC link voltage Vdc that takes a constant value, makes the output power Pout constant.

A third tier of FIG. 6 shows waveforms of the rectified current irec, the current idirect (this is obtained by a product of the rectifying duty dr and the estimated value idc^: the same applies to the following), and the current ib (this is assumed to accurately follow the command value ib*: the same applies to the following).

A fourth tier of FIG. 6 shows waveforms of the rectifying duty dr, the discharge duty dc, and the zero voltage duty dz.

A fifth tier of FIG. 6 shows waveforms of the DC current idc, the current idirect, the current is flowing from the capacitor 34 to the DC link 7 (this is obtained by a product of the discharge duty dc and the estimated value idc^: the same applies to the following), and a zero-phase current iz (this is obtained by a product of the zero voltage duty dz and the estimated value idc^: the same applies to the following).

A first tier of FIG. 7 shows waveforms of an output power Pout to be output from the inverter 6 (this is assumed to be accurately estimated by its estimated value Pout^: the same applies to the following), an electric power Pdirect to be determined based on the rectified voltage Vrec and the current idirect, an electric power (discharge power) Pco to be discharged from the capacitor 34, and an electric power Pc to be input/output to/from the capacitor 34. The electric power Pc takes a negative value because it reduces the output power Pout in charging.

A second tier of FIG. 7 shows waveforms of the input power Pin (this is assumed to accurately follow the command value Pin*: the same applies to the following), the electric power Pdirect, an electric power (charge power) Pci with which the capacitor 34 is charged, and the electric power Pc.

A third tier of FIG. 7 is a graph summarizing electric powers Pc, Pci, and Pco related to the capacitor 34, which are extracted from the first and second tiers of FIG. 7.

The capacitor 34 is charged but is not discharged during "charge" periods in FIGS. 6 and 7 (Pci>0, Pco=0). Specifically, the "charge" period is a period during which the virtual DC link voltage Vdc is smaller than or equal to the rectified voltage Vrec and ic=0 (that is, dc=0), and Steps S106 and S109 of FIG. 5 are performed.

The capacitor 34 is discharged but is not charged during the "discharge" period (Pco>0, Pci=0). Specifically, the "discharge" period is a period during which the virtual DC link voltage Vdc is greater than the rectified voltage Vrec and iz>0 (that is, dz>0), and Steps S108 and S110 of FIG. 5 are performed.

The "charge and discharge" period is a period during which the virtual DC link voltage Vdc is greater than the rectified voltage Vrec and iz=0 (that is, dz=0), and Steps S107 and S109 of FIG. 5 are performed. The "charge and discharge" period includes a period during which the electric power Pci with which the capacitor 34 is charged is greater than the electric power Pco to be discharged from the capacitor 34 (that is, a period during which Pc<0: this is adjacent to the "charge" period and is separate from the "discharge" period) and a period during which the electric power Pco to be discharged from the capacitor 34 is greater than the electric power Pci with which the capacitor 34 is charged (that is, the period during which Pc>0: this is adjacent to the "discharge" period and is separate from the "charge" period).

The "charge and discharge" period is provided and the capacitor 34 is charged also in this period as described above, so that the average value or the effective value of the current ib can be reduced more than in the conventional technique in which a capacitor is charged only during the "charge" period. This contributes to a reduction in the rated current required for the inductor 32, and accordingly, a reduction in the power capacity required for the boost chopper 3.

It is noted that in the case shown in FIGS. 6 and 7, the virtual DC link voltage Vdc is set to $1/\sqrt{2}$ times the crest value of the rectified voltage Vrec. Therefore, the following will be described: while the rectified current irec has a sinusoidal waveform, the virtual DC link voltage Vdc can be set to be higher than $1/\sqrt{2}$ times the crest value of the rectified voltage Vrec.

Example 2

Figure 8:
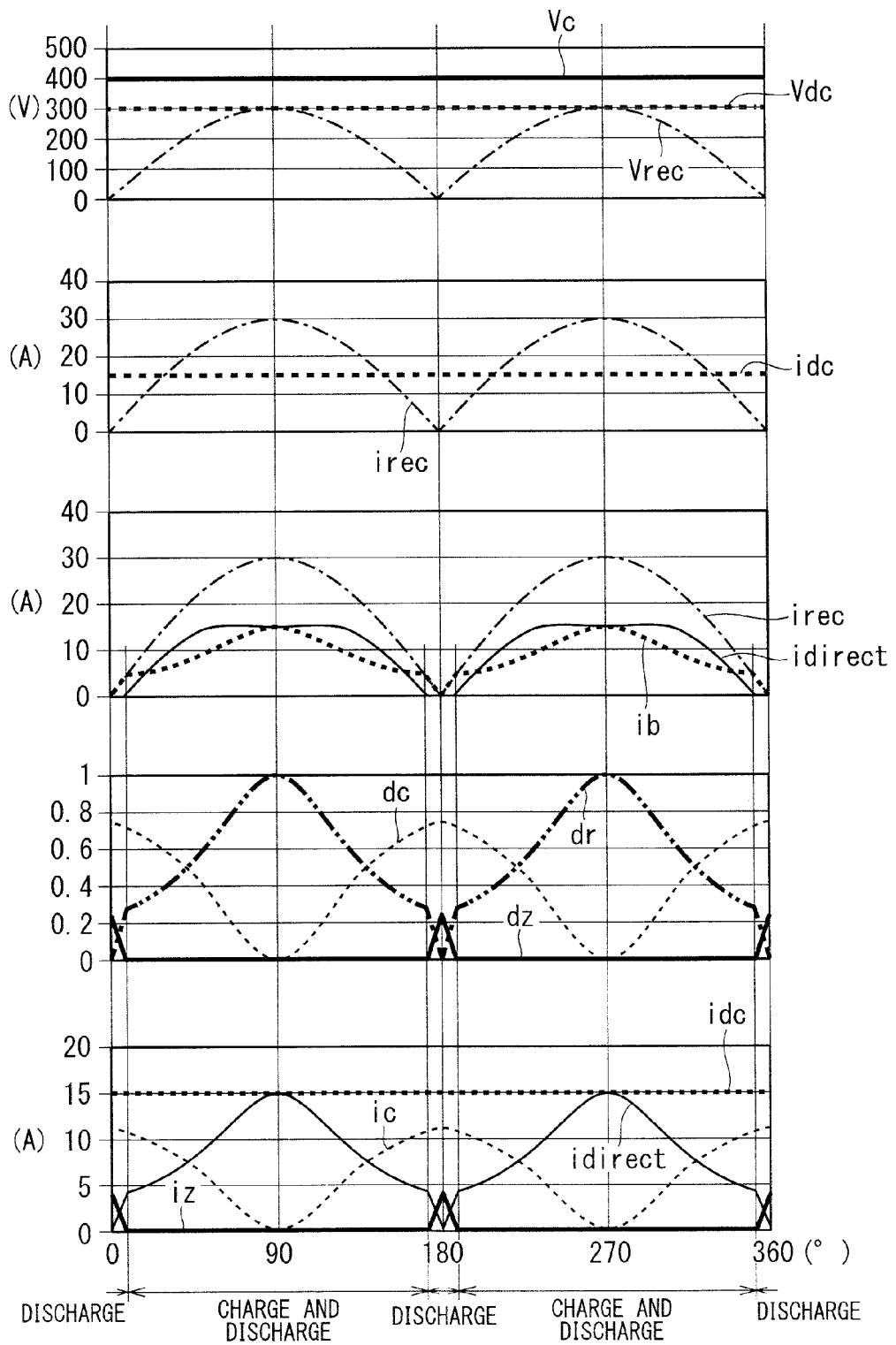
FIGS. 8 and 9 are graphs showing waveforms of specifications of Example 2.
Figure 9:
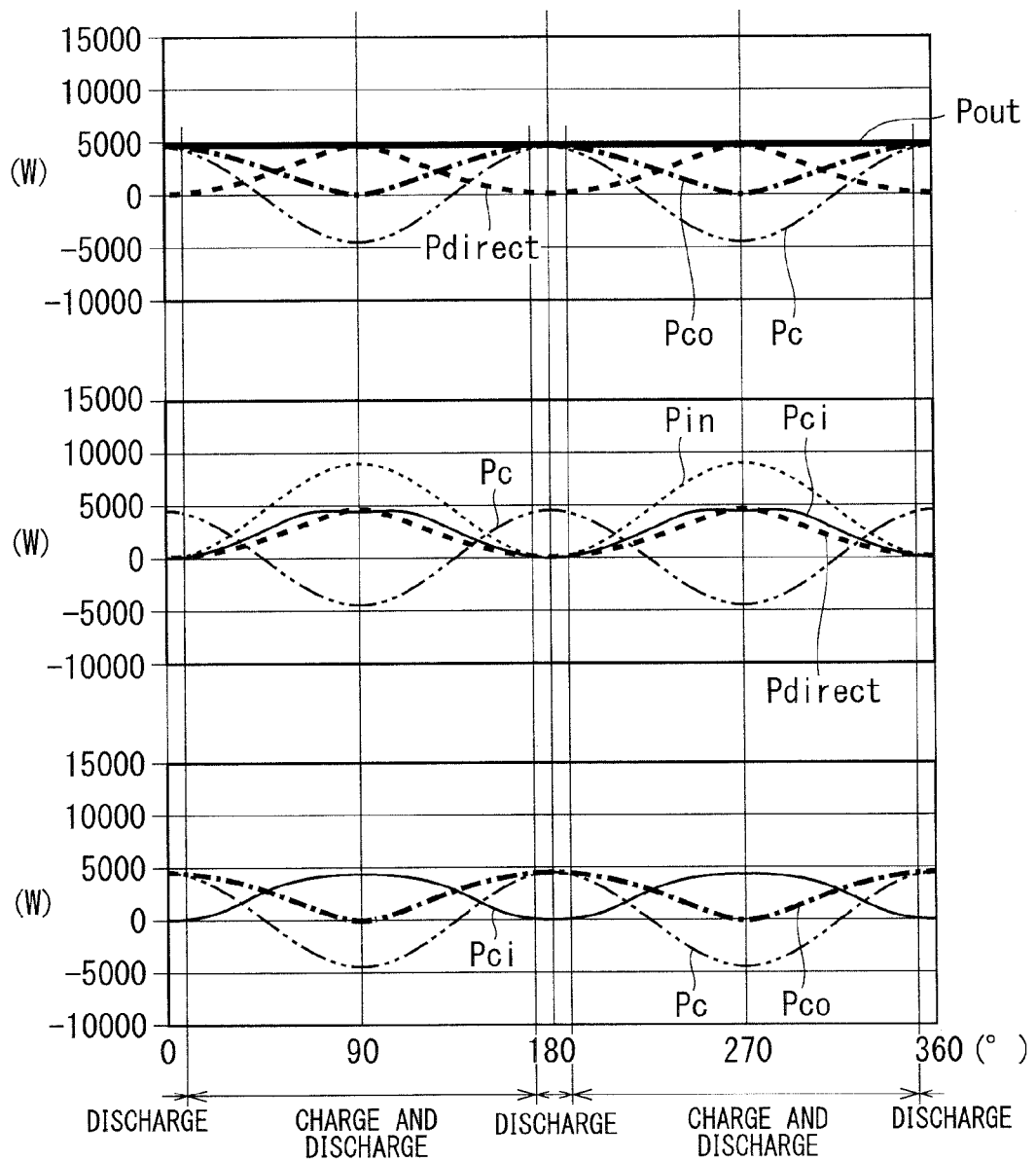

FIGS. 8 and 9 are graphs showing waveforms of specifications obtained by simulation through control in accordance with the method of this embodiment. FIG. 8 shows the waveforms of the specifications corresponding to FIG. 6. FIG. 9 shows the waveforms of the specifications corresponding to FIG. 7 except for the graph shown in the lowest tier. FIGS. 8 and 9 show the case in which the crest value of the rectified voltage Vrec is set to 300 V as in FIGS. 6 and 7, the virtual DC link voltage Vdc is set to be equal to the crest value of the rectified voltage Vrec, and the waveform of the rectified current irec is the absolute value of the sinusoidal wave.

When the virtual DC link voltage Vdc is equal to the crest value of the rectified voltage Vrec as described above, dc=0 holds only at a phase of 90° or 270°. FIGS. 8 and 9 therefore show no "charge" period.

Further, when the virtual DC link voltage Vdc is smaller than the capacitor voltage Vc, control can be performed to always make the virtual DC link voltage Vdc greater than the rectified voltage Vrec. In this case, dc>0 always holds, and Step S106 is performed in no case as shown in the flowchart of FIG. 5. Needless to say, since Expression (1) holds, dr<1.

Examples 1 and 2 reveal that the virtual DC link voltage Vdc can be set to be greater than or equal to $1/\sqrt{2}$ times the crest value of the rectified voltage Vrec.

In particular, Example 2 reveals that the waveform of the rectified current irec can be the absolute value of a sinusoidal wave. This contributes to the restriction of the power line harmonics.

Example 3

As described in Example 1, when the virtual DC link voltage Vdc is greater than the rectified voltage Vrec, there is a "charge and discharge" period during which dz=0. The voltage Vinv output from the inverter 6 during this period is not a DC voltage but an AC voltage. When the virtual DC link voltage Vdc takes a constant value, therefore, the inverter 6 operates with a zero voltage vector for the voltage Vinv to be AC if dz=0.

This means that the virtual DC link voltage Vdc is excessive with respect to the voltage Vinv, and the capacitor 34 is charged and discharged unnecessarily.

Description will now be given of the virtual DC link voltage Vdc for reducing the unnecessary charge and discharge of the capacitor 34 and reducing the power capacity of the boost chopper 3.

Figure 10:
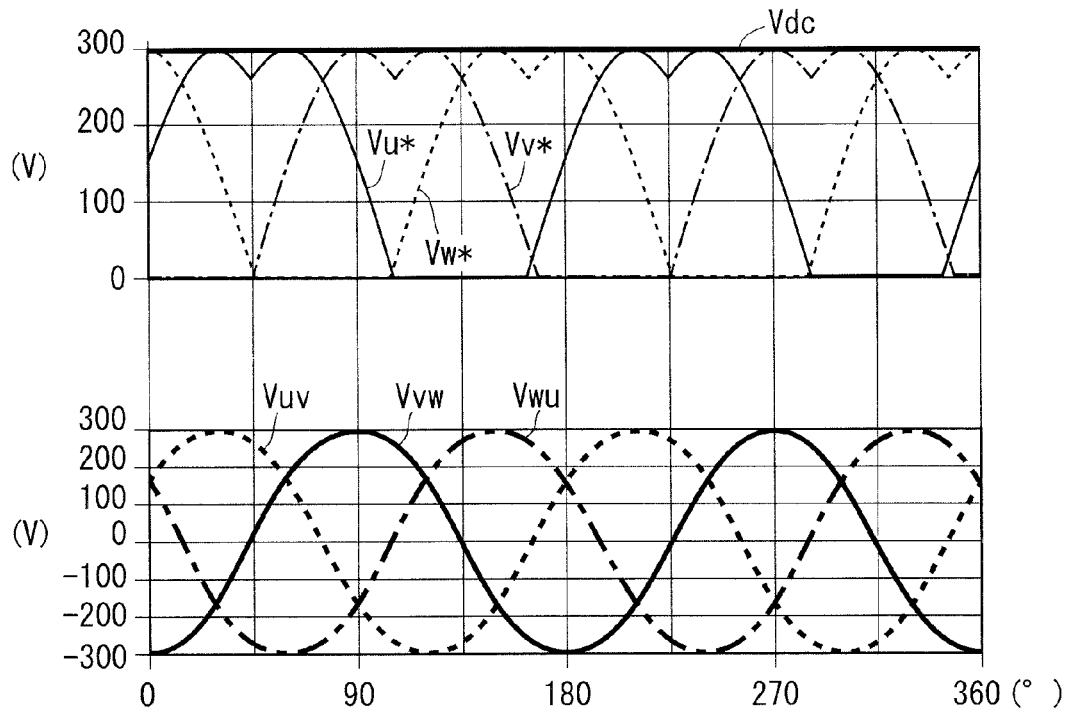
FIG. 10 is a graph showing a relationship between a command value of a virtual DC link voltage and a command value of an inverter.
Figure 11:
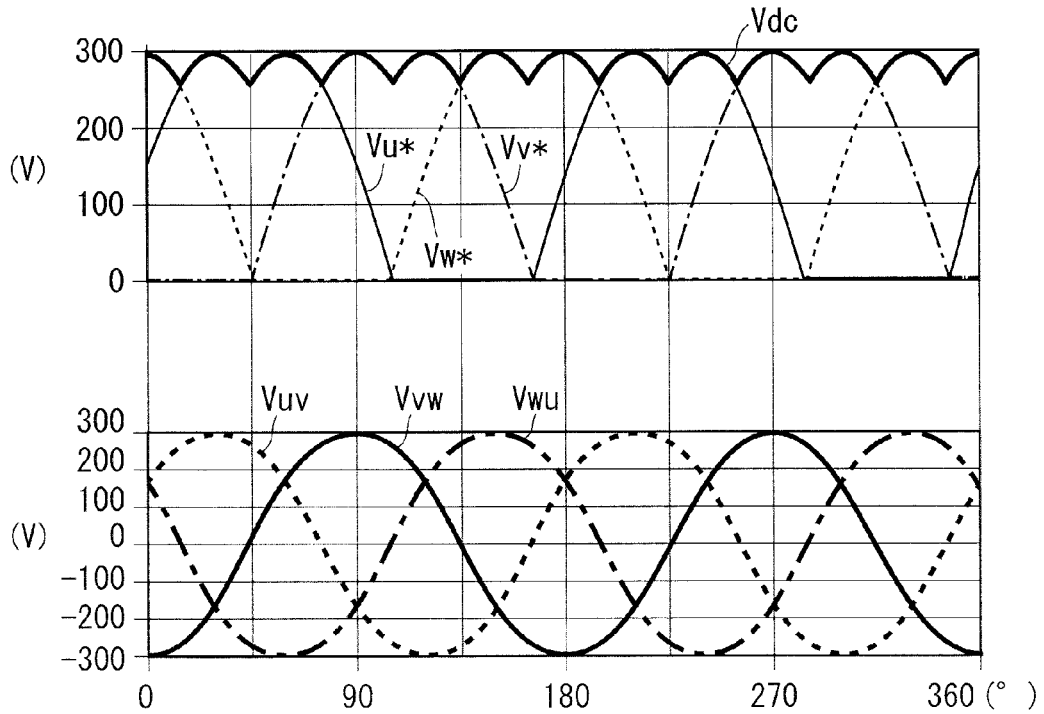
FIG. 11 is a graph showing a relationship between a command value of the virtual DC link voltage and a command value of the inverter.

Both FIGS. 10 and 11 show, in an upper tier, command values Vu*, Vv*, and Vw* of three phases as the command value Vinv* of the inverter 6 and the virtual DC link voltage Vdc and show, in a lower tier, line-to-line voltages Vuv, Vvw, and Vwu obtained by the inverter 6 outputting the voltage Vinv based on the command values Vu*, Vv*, and Vw*. In the command values Vu*, Vv*, and Vw*, a minimum-phase voltage (minimum value) of them is zero. The horizontal axis common to FIGS. 10 and 11 is the phase of the AC voltage Vin, and illustrated herein is the case in which the cycle of the AC voltage Vin is twice the cycles of the line-to-line voltages Vuv, Vvw, and Vwu.

FIG. 10 shows the case in which the virtual DC link voltage Vdc takes a constant value. The constant value is a maximum value that the command values Vu*, Vv*, and Vw* can take with respect to a minimum-phase voltage of the command values of three phases (hereinbelow, this value is a value V2).

It is revealed that with a phase of (15+30·n) degrees (n is an integer) and therearound, the virtual DC link voltage Vdc is greater than the command values Vu*, Vv*, and Vw* and is thus a value greater than or equal to a voltage required for the line-to-line voltages Vuv, Vvw, and Vwu. In such a case, even when dz=0, the inverter 6 adopts the zero voltage vector in order to output a voltage lower than the virtual DC link voltage Vdc.

That is to say, at a phase of (15+30·n) degrees (n is an integer) and therearound, the virtual DC link voltage Vdc is set to be unnecessarily high in view of the operation of the inverter 6. This results in unnecessary discharge for obtaining such an unnecessarily high virtual DC link voltage Vdc.

When the command value Vdc* of the virtual DC link voltage Vdc is set without being unnecessarily increased with respect to the command values Vu*, Vv*, and Vw*, an unnecessary discharge of the capacitor 34 is reduced, and accordingly, an unnecessary charge of the capacitor 34 is reduced.

This will be described with reference to the flowchart of FIG. 5. Since an improvement in the case in which dz=0 is considered here, Step S103 that leads to Step S107 of setting dz=0 is considered. Normally, Vc>Vrec and Vc>Vdc*, and thus, dr_max becomes greater as the command value Vdc* is smaller. As the command value Vdc* is smaller, thus, the rectifying duty dr set in Step S107 is greater and the discharge duty dc is smaller. Since the capacitor voltage Vc can be considered to be constant, a smaller discharge duty means a smaller current ic.

Further, Step S109 processed after Step S107 will also be considered. As described above, the rectifying duty dr becomes greater as the command value Vdc* is smaller. The output power Pout is made constant, and accordingly, the pulsation of the command value Vdc* causes the DC current idc to pulsate. Specifically, the DC current idc becomes greater as the command value Vdc* is smaller. Thus, both the rectifying duty dr and the DC current idc are greater as the command value Vdc* is smaller, and the rectified current irec does not depend on the command value Vdc* as a sinusoidal wave, and accordingly, the current ib is small.

Such reductions in the currents ib and ic contribute to a reduction in the power capacities required for the inductor 32 and the capacitor 34, and accordingly, miniaturization of the inductor 32 and the capacitor 34, cost reduction, and an improvement in efficiency owing to a reduced calorific value, and further contribute to a reduction in the power capacity required for the boost chopper 3.

Specifically, the command value Vdc* may be the greatest command value among the command values Vu*, Vv*, and Vw* with respect to a minimum phase. This is because while the inverter 6 cannot output a large voltage exceeding the virtual DC link voltage Vdc, it suffices that the virtual DC link voltage Vdc is the greatest command value among the command values Vu*, Vv*, and Vw* with respect to a minimum phase.

That is to say, the command value Vdc* may have V1=max(Vu*, Vv*, Vw*)−min(Vu*, Vv*, Vw*), where a symbol "max( )" represents the greatest one among the elements within a parenthesis, and a symbol "min( )" represents the smallest one among the elements within a parenthesis.

Under normal control, phase voltages Vu, Vv, and Vw output from the inverter 6 respectively match the command values Vu*, Vv*, and Vw*, and thus, the value V1 can beobtained as V1 =max(Vu, Vv, Vw) - min(Vu, Vv, Vw). This can be obtained as V1 =max(|Vuv|, |Vvw|, |Vwu|) using line-to-line voltages Vuv, Vvw, and Vwu.

Similarly, the value V2 can be obtained as a maximum value that the phase voltages Vu, Vv, and Vw output from the inverter 6 can take with respect to a minimum phase among them. This means that the value V2 can be obtained as a maximum value that the respective absolute values |Vuv|, |Vvw|, and |Vwu| of the line-to-line voltages Vuv, Vvw, and Vwu can take.

FIG. 11 illustrates a case in which the command value Vdc* takes the value V1. Also in this case, the command values Vu*, Vv*, and Vw* can take the same values as those of FIG. 10, and thus, the line-to-line voltages Vuv, Vvw, and Vwu also do not differ between FIGS. 10 and 11.

Needless to say, the command value Vdc* may take a value greater than the value V1. In the case shown in FIG. 10, the command value Vdc* takes the value V2 greater than the value V1, and thus, it suffices that V1<Vdc*<V2.

More accurately, it is desirable that Vdc*=V2 at a phase (with reference to FIGS. 10 and 11, (30·n) degrees) at which the command values Vu*, Vv*, and Vw* are maximum with respect to a minimum phase and that V1<Vdc*<V2 at the other phases.

The command value Vdc* can be set as described above in the virtual DC link voltage command value generator 98 shown in FIG. 4.

Figure 12:
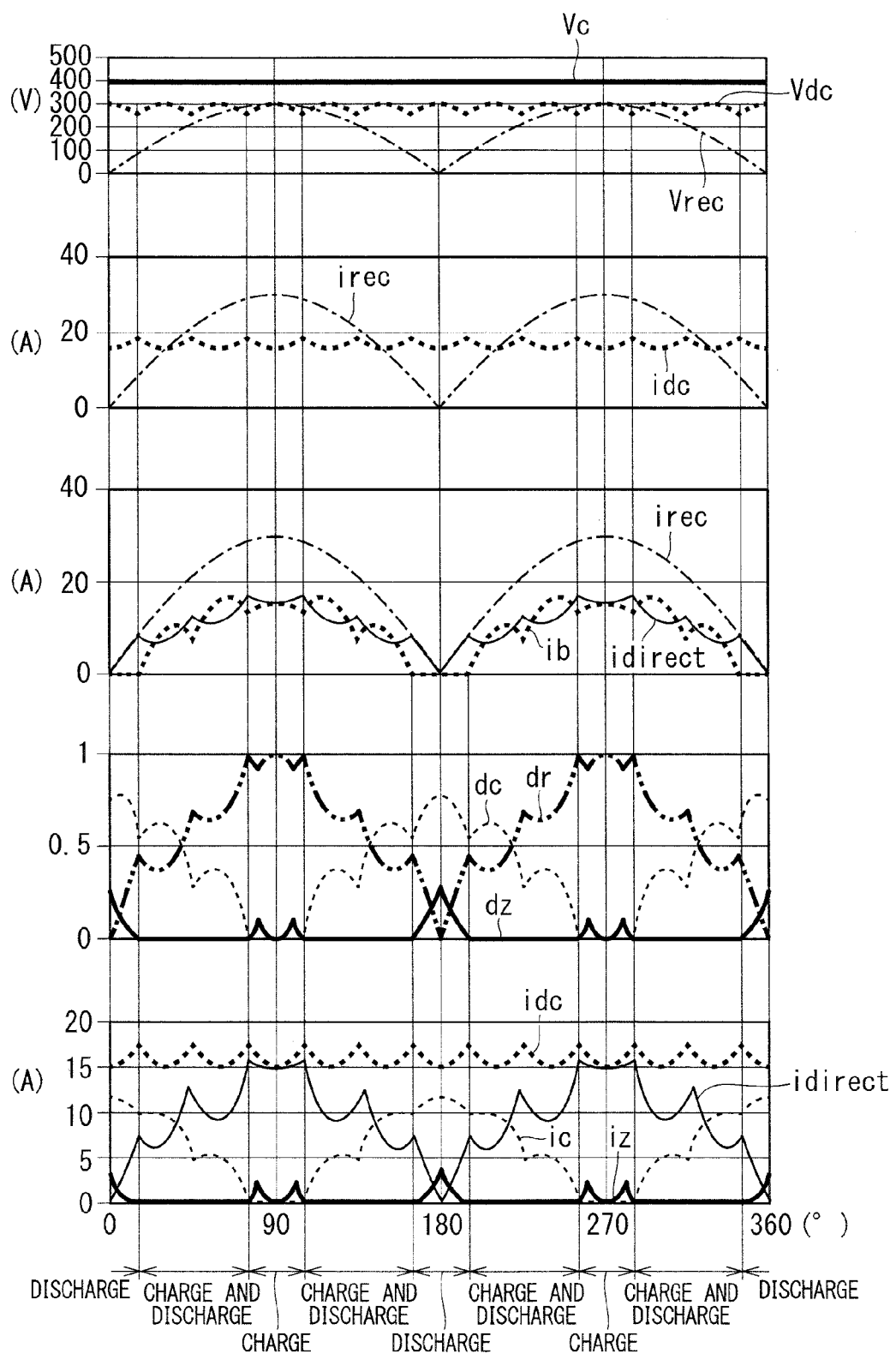

FIG. 12 shows waveforms of the specifications corresponding to FIG. 8 in Example 3. FIG. 13 shows the specifications corresponding to FIG. 9 and waveforms of line-to-line voltages. For brevity of the drawings, the cycles of the line-to-line voltages Vuv, Vvw, and Vwu are set to a half of the cycle of the AC voltage Vin, and the amplitudes of the line-to-line voltages Vuv, Vvw, and Vwu are set to be equal to the amplitude of the AC voltage Vin.

It is revealed that while the DC current idc fluctuates correspondingly to the variation of the command value Vdc*, the waveform of the rectified current irec can take an absolute value of a sinusoidal wave. As described with reference to FIG. 5, the currents ib and ic also reduce at phases at which the command value Vdc* reduces.

Figure 14:
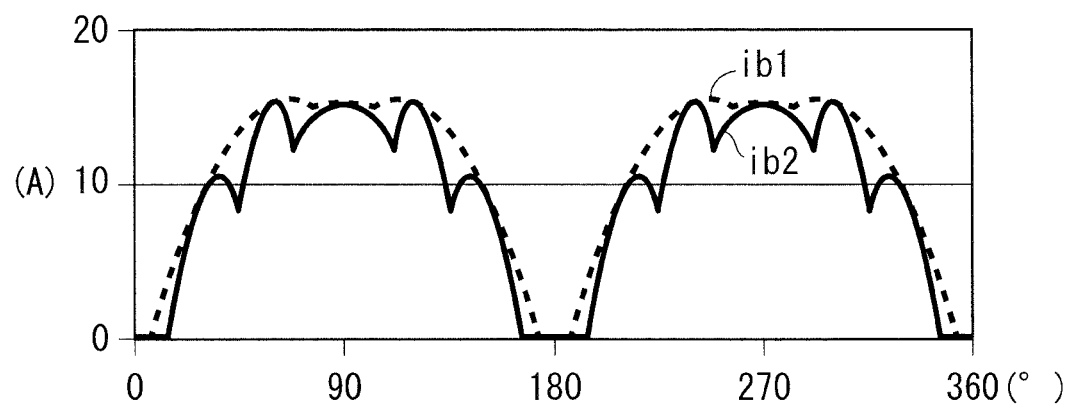
FIG. 14 is a graph showing waveforms of currents flowing in inductors of Examples 2 and 3.

FIG. 14 is a graph in which the current ib is compared between Examples 2 and 3. The current ib in Example 2 is indicated by the current ib1, and the current ib in Example 3 is indicated by the current ib2. It is understood that the current ib2 is always smaller than or equal to the current ib1 and that the effective value and the average value of the current ib2 are smaller than the effective value and the average value of the current ib1.

Figure 15:
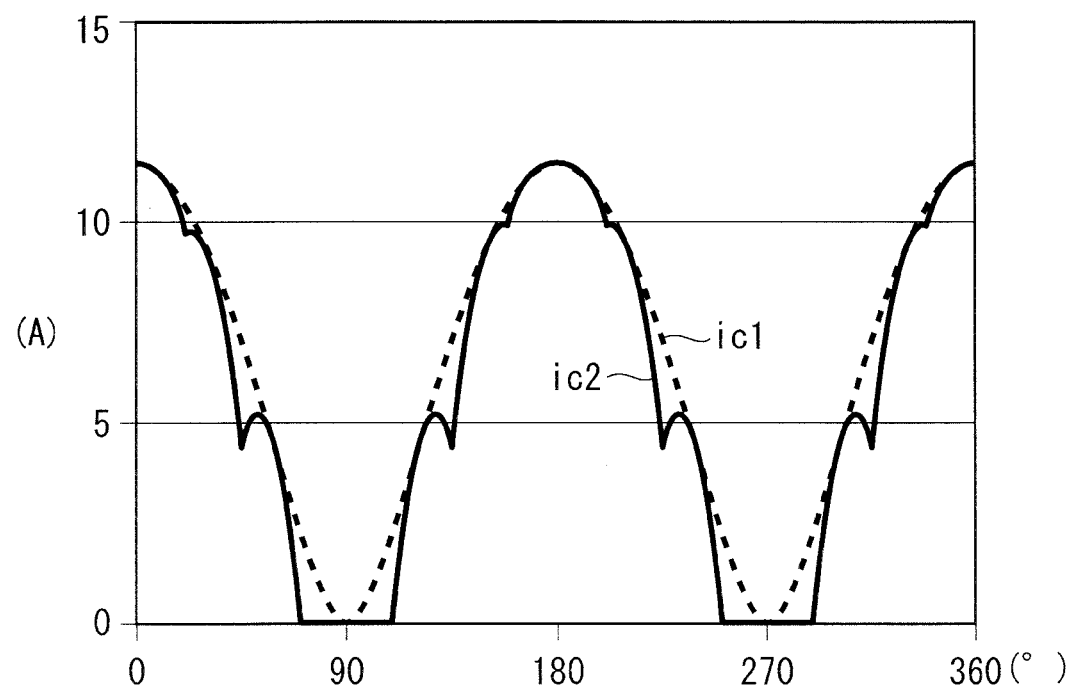
FIG. 15 is a graph showing waveforms of currents flowing through capacitors of Examples 2 and 3.

FIG. 15 is a graph in which the current ic is compared between Examples 2 and 3. The current ic in Example 2 is indicated by the current ic1, and the current ic in Example 3 is indicated by the current ic2. It is understood that the current ic2 is always smaller than or equal to the current ic1 and that the effective value and the average value of the current ic2 are smaller than the effective value and the average value of the current ic1.

It is revealed that both the currents ib2 and ic2 reduce at a phase (15+30·n) degrees at which the command value Vdc* reduces and therearound.

Next, the operation of the inverter 6 in the period in which dz=0 will be described.

Figure 17:
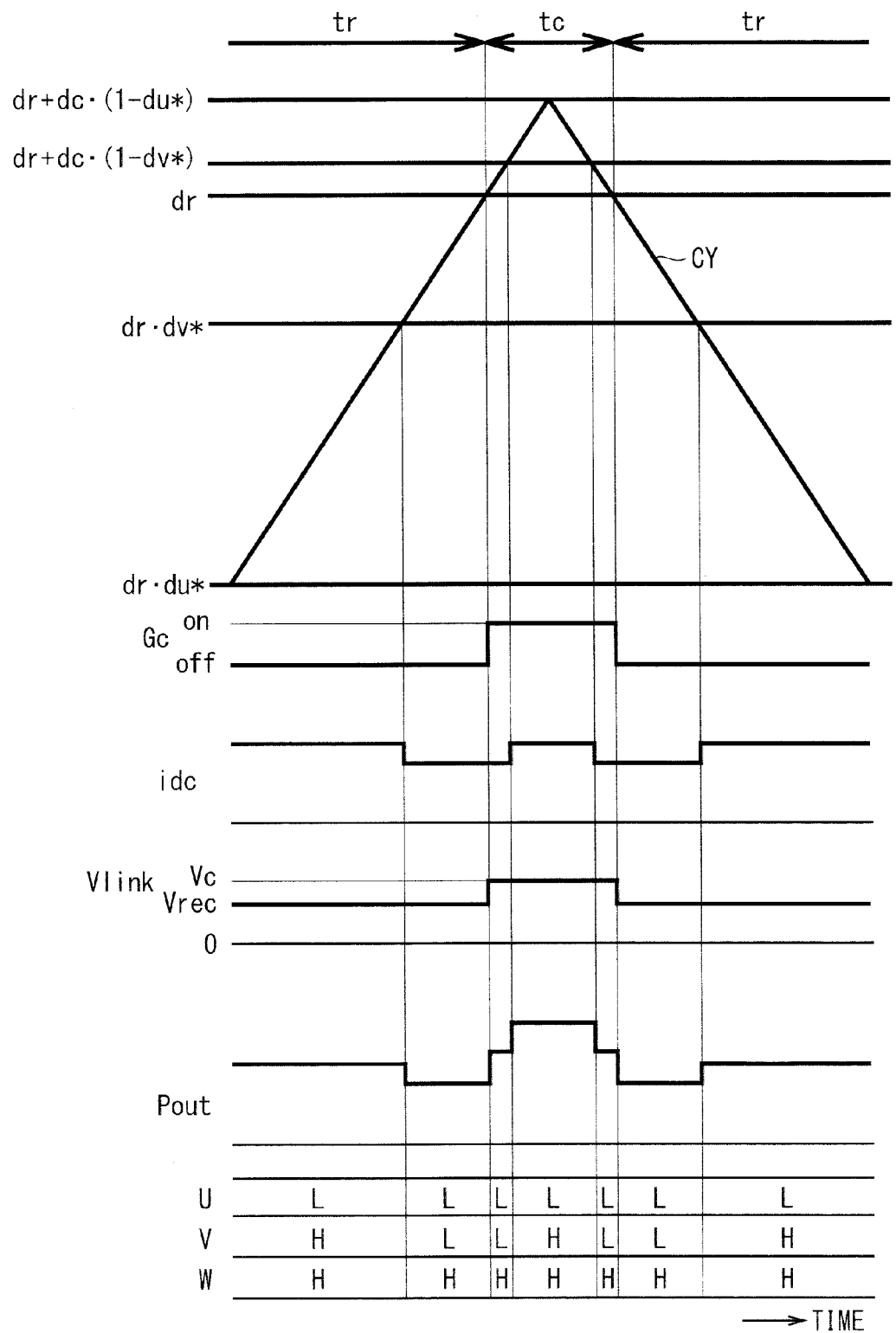
FIG. 17 is a graph showing an operation of an inverter of Example 3.

FIGS. 16 and 17 are graphs showing a carrier CY and a signal wave to be compared with the carrier CY, an operation of the switch Gc, a DC current idc and an instantaneous value Vlink between DC link voltages, an output power Pout, and switching states of respective phases that will be described below. Herein, a minimum value of the carrier CY is 0, and a maximum value of the carrier CY is 1. Values du*, dv*, and dw* are adopted to generate a signal wave and are set based on the command values Vu*, Vv*, and Vw* of the inverter 6 by the known technique. Specifically, du*=Vu*/Vdc*, dv*=Vv*/Vdc*, and dw*=Vw*/Vdc*.

Both FIGS. 16 and 17 show an operation in areas in which a U-phase voltage output from the inverter 6 is a minimum phase, a W-phase voltage output from the inverter 6 is a maximum phase, Vu*<Vv*<Vw* holds, and none of the command values Vv* and Vw* peaks (zones of 135 degrees or more and less than 150 degrees, more than 150 degrees and 165 degrees or less, 315 degrees or more and less than 330, and more than 330 degrees and 345 degrees or less in terms of phases: see FIG. 10). In such a case, Vu*=0, and dz=0 (see also FIG. 12).

A period tc is a period in which the switch Ge turns on. In the period tc, accordingly, the capacitor 34 is discharged, the instantaneous value Vlink is the capacitor voltage Vc, and the electric power Pco provides the output power Pout. A period tr is a period in which the switch Ge turns off. In the period tr, accordingly, the instantaneous value Vlink provides the rectified voltage Vrec, and the electric power Pdirect is the output power Pout.

The control signal Sg is determined through the comparison between the carrier CY and the signal wave, and accordingly, the switching operation of the inverter 6 is determined. Specifically, for example, the inverter 6 is a three-phase voltage-source inverter and has a current path (leg) per phase. Each leg has a series connection between an upper arm and a lower arm, and switches are used as the upper arm and the lower arm that are conductive exclusively (see FIG. 1).

More specifically, in the U-phase leg, the upper arm is conductive and the lower arm is not conductive when the carrier CY is smaller than or equal to the signal wave dr·du* or is greater than or equal to the signal wave dr+dc·(1−du*). In the other case, the lower arm is conductive and the upper arm is not conductive. The same applies to the V-phase leg and the W-phase leg.

Such a control signal Sg that determines conductivity/non-conductivity is generated in the pulse width modulation signal generator 94. The carrier CY is generated in, for example, the pulse width modulation signal generator 94.

The lowest three rows of each of FIGS. 16 and 17 indicate the switching states in the U-phase, the V-phase, and the W-phase of the inverter 6. In these three lines, a symbol "H" indicates the state in which the upper arm is conductive and the lower arm is not conductive, and a symbol "L" indicates the state in which the lower arm is conductive and the upper arm is not conductive.

In the areas of the phases described above, Vu*=0 and signal wave dr·du*=0, dr+dc·(1−du*)=1(∵·dz=0), and thus, the case in which the lower arm is kept conductive is illustrated for the U-phase. That is to say, switching does not occur at the U-phase leg in this area.

In such a case, when Vdc*>Vw* as shown in FIG. 10, as shown in FIG. 16, a signal wave has a relationship dr+dc·(1−dw*)<dr<dr·dw*, where dz=0 is taken into consideration. This results in the presence of a zone t0 with a width corresponding to a difference (1−dw*) between the command values dr+dc·(1−dw*) and dr·dw*. The zone t0 is a period in which although dz=0, the inverter 6 adopts a zero voltage vector.

In the zone t0, the inverter 6 adopts the zero voltage vector, so that the DC current idc is 0 and the instantaneous value of the output power Pout is also 0. Nevertheless, the zone t0 includes a period in which the switch Ge is conductive and the instantaneous value Vlink increases, and a discharge of the capacitor 34 during this period is an unnecessary discharge in view of the operation of the inverter 6.

When the command values are equal between the case shown in FIG. 16 and the case shown in FIG. 17, a period in which the instantaneous value Vlink takes the capacitor voltage Vc is shortened by setting Vdc*=Vw* as shown in FIG. 11. That is to say, the period tc is shortened. This results from a reduction in the discharge duty dc described above.

Setting Vdc*=Vw*, the upper arm is always conductive in the W-phase leg in the area of the phase described above.

That is to say, no switching operation is required in the W-phase leg, that is, not only switching based on a minimum one (herein, command value Vu*) among the command values is not required, but also switching based on a maximum one (herein, command value Vw*) among the command values is not required. Unlike FIG. 16, there is accordingly no zone t0 as shown in FIG. 17.

Since dz=0, a shorter period tc results in a longer period tr, a greater output power Pout (that is to say, electric power Pdirect) in the period tr, and a smaller output power Pout (that is to say, electric power Pco) in the period tc. The average of the output power Pout, however, can be maintained even when the command value Vdc* is reduced.

The effect of reducing the period tc for a reduced period tr is obtained by reducing the duration of a zone t0 even in the presence of such a zone t0. The effect is thus obtained if Vdc*=V1 (Vw* in the example above) does not always hold.

Through setting of the command value Vdc* to be greater than or equal to the value V1 and smaller than or equal to the value V2, the discharge duty dc can be reduced, the currents ic and ib can be reduced, and the power capacities required for the boost chopper and the capacitor 34 and the inductor 32, which are components of the boost chopper, can be reduced while the output voltage from the direct AC power converter is increased more than in the conventional case. The virtual DC link voltage Vdc takes the command value Vdc* in the normal control, and thus, the effect described above can be obtained when the virtual DC link voltage Vdc is greater than or equal to the value V1 and smaller than or equal to the value V2.

In particular, setting the command value Vdc* to the value V1 eliminates the need for the switching operations of two phases among the legs of the three phases of the inverter 6. This is desirable not only in that the generation of a control signal Sg for substantially two phases is omitted but also in that a switching loss of the inverter 6 is reduced.

Needless to say, even when the command value Vdc* is not always set to the value V1, a switching loss of the inverter 6 is reduced during a period during which the command value Vdc* is set to the value V1. In other words, the presence of the period during which the command value Vdc* is set to the value V1 contributes to a reduction in the switching loss of the inverter 6.

The virtual DC link voltage Vdc takes the command value Vdc* in normal control. Therefore, the presence of the period during which the virtual DC link voltage Vdc takes the value V1 reduces a switching loss of the inverter 6.

While the invention has been shown and described in detail, the foregoing description is in all aspects illustrative and not restrictive. It is therefore understood that numerous modifications and variations can be devised without departing from the scope of the invention.

The invention claimed is:

1. A direct AC power converter comprising:
   a DC link having
      a first power supply line, and
      a second power supply line to which a potential lower than a potential of said first power supply line is applied;
   a first rectifying circuit having
      a plurality of input terminals that receive an input of an AC voltage, and
      a pair of output terminals each connected to said DC link;
   an inverter that converts a voltage applied to said DC link into another multi-phase AC voltage;

a boost chopper having a capacitor in an output stage thereof; and a switch that performs a discharge/non-discharge from said capacitor to said DC link, wherein in said boost chopper, said capacitor is charged at least during a first period being a part of a period during which a discharge duty is greater than 0, said discharge duty being a time ratio at which said switch is conductive, a virtual DC link voltage is greater than or equal to a first value and smaller than or equal to a second value, said virtual DC link voltage being expressed as a sum of a product of said discharge duty and a voltage between both ends of said capacitor and a product of a rectifying duty and a rectified voltage of said AC voltage, said rectifying duty takes a value obtained by subtracting a sum of said discharge duty and a zero voltage duty from 1, said zero voltage duty is a time ratio at which said inverter adopts a zero voltage vector irrespective of magnitude of a voltage output from said inverter, said first value is a maximum value among absolute values of respective line-to-line voltages of said multiphase AC voltage, said second value is a maximum value that said absolute values are capable of taking, and said rectified voltage is applied to an input side of said boost chopper, or said pair of output terminals of said first rectifying circuit are connected to said input side of said boost chopper.

2. The direct AC power converter according to claim 1, wherein said capacitor is charged in said boost chopper during said first period and a part or whole of a period at which said discharge duty is 0.

3. The direct AC power converter according to claim 1, wherein said capacitor is charged and discharged with a charge power and a discharge power during said first period, and said first period has a period during which said charge power is greater than said discharge power and a period during which said discharge power is greater than said charge power.

4. The direct AC power converter according to claim 1, wherein a period during which said virtual DC link voltage takes said first value is present.

5. The direct AC power converter according to claim 1, wherein said discharge duty at which said zero voltage duty is minimum is set based on a command value of a rectified current being a sum of a current flowing in said boost chopper and a current flowing from said first rectifying circuit to said inverter, a command value of said virtual DC link voltage, a voltage between both ends of said capacitor, said rectified voltage, and a current input to said inverter.

6. The direct AC power converter according to claim 5, wherein when said virtual DC link voltage is greater than said rectified voltage and said command value of said rectified current is greater than or equal to a product of a predetermined value and a current input to said inverter, said rectifying duty takes said predetermined value, and said discharge duty takes a value obtained by subtracting said predetermined value from 1, and said predetermined value is a value obtained by dividing a value obtained by subtracting said voltage between both ends of said capacitor from said command value of said virtual DC link voltage by a value obtained by subtracting said voltage between both ends from said rectified voltage.

7. The direct AC power converter according to claim 1, further comprising a second rectifying circuit that inputs said rectified voltage to said boost chopper.

8. The direct AC power converter according to claim 1, wherein said pair of output terminals of said first rectifying circuit are connected to an input side of said boost chopper.

9. The direct AC power converter according to claim 1, wherein said discharge duty is always positive.

10. The direct AC power converter according to claim 1, further comprising a diode in parallel with said switch, a forward direction of said diode is a direction in which said capacitor is charged from said DC link.

* * * * *